United States Patent
McAnaney et al.

(10) Patent No.: US 6,654,767 B2
(45) Date of Patent: Nov. 25, 2003

(54) METHODS AND SYSTEMS FOR MANAGING INVENTION DISCLOSURES

(75) Inventors: Brian T. McAnaney, Stamford, CT (US); William E. Bandon, III, Katonah, NY (US); Stephen D. Kahn, Brooklyn, NY (US); Todd L. Mattson, New York, NY (US); Patrick Kennedy Patnode, Ballston Spa, NY (US); Jean Kelly Testa, Rexford, NY (US); Mary McCrea NcNamara, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 09/751,873

(22) Filed: Dec. 29, 2000

(65) Prior Publication Data

US 2002/0087562 A1 Jul. 4, 2002

(51) Int. Cl.⁷ .............................................. G06C 17/30
(52) U.S. Cl. ...................... 707/104.1; 707/102; 715/507
(58) Field of Search .............................. 707/104.1, 102; 715/507

(56) References Cited

U.S. PATENT DOCUMENTS

| | | | | |
|---|---|---|---|---|
| 5,208,765 A | * | 5/1993 | Turnbull | 702/84 |
| 5,267,155 A | * | 11/1993 | Buchanan et al. | 715/540 |
| 5,509,070 A | * | 4/1996 | Schull | 705/54 |
| 6,014,677 A | * | 1/2000 | Hayashi et al. | 707/104.1 |
| 6,029,195 A | * | 2/2000 | Herz | 725/116 |
| 6,038,560 A | * | 3/2000 | Wical | 707/5 |
| 6,081,576 A | | 6/2000 | Schanen et al. | |
| 6,105,093 A | | 8/2000 | Rosner et al. | |
| 6,167,394 A | | 12/2000 | Leung et al. | |
| 6,219,674 B1 | * | 4/2001 | Classen | 707/104.1 |
| 6,289,382 B1 | | 9/2001 | Bowman-Amuah | |
| 6,298,327 B1 | | 10/2001 | Hunter et al. | |
| 6,304,967 B1 | | 10/2001 | Braddy | |
| 6,308,005 B1 | | 10/2001 | Ando et al. | |
| 6,308,111 B1 | | 10/2001 | Koga | |
| 6,308,143 B1 | | 10/2001 | Segawa | |
| 6,308,226 B1 | | 10/2001 | Kainuma | |
| 6,311,220 B1 | | 10/2001 | Fischer et al. | |
| 6,312,378 B1 | | 11/2001 | Bardy | |
| 6,339,767 B1 | * | 1/2002 | Rivette et al. | 707/2 |
| 6,341,292 B1 | * | 1/2002 | Cho et al. | 707/203 |
| 6,470,338 B1 | * | 10/2002 | Rizzo et al. | 707/6 |
| 6,549,894 B1 | * | 4/2003 | Simpson et al. | 707/1 |
| 2002/0042784 A1 | * | 4/2002 | Kerven et al. | 706/12 |
| 2002/0059076 A1 | * | 5/2002 | Grainger et al. | 705/1 |

* cited by examiner

*Primary Examiner*—Wayne Amsbury
(74) *Attorney, Agent, or Firm*—Armstrong Teasdale LLP

(57) ABSTRACT

Methods and systems for management of invention disclosures, in one exemplary embodiment, utilizes a system including a server and at least one device connected to the server via a network. The system restricts access of users based upon job description. In addition, the system facilitates evaluation of each invention disclosure by storing invention disclosure information input by users and sorting invention disclosures based on criteria input by the submitter as well as by other multiple users via the device. Invention disclosure information is based upon at least one of an innovation disclosure, a patentability assessment, an intrinsic value assessment, a competitive value assessment and an overall assessment of the invention.

95 Claims, 23 Drawing Sheets

Welcome — 50

Returning Visitors

Your User Name [_____] —52
Your Password [_____] —54

[ Click to enter site... ] —58

Forgot Your Password?

New Visitors

Register Here! —56

Questions or comments about the site?  Please contact the Webmaster

Company A
1 North Street
New York, New York  00000

FIG. 3

User Registration

Please enter your information below and submit this form to gain access to Site...
You will be notified by e-mail within 48 hours when your registration has been approved.

| Step 1 | Step 2 |

— 60

First Name: [_____]
Last Name: [_____]
Company: [_____]
Email: [_____]    } — 62
Phone Number: [_____]
Keyword: [_____]
Password: [syyum184]

All Fields Required

[ Next Step ] —64

FIG. 4

User Registration

Please enter your information below and submit this form to gain access to Site...

You will be notified by e-mail within 48 hours when your registration has been approved.

| Step 1 | Step 2 |

You have entered an incorrect keyword. You will not have access to the site without a correct keyword.

Return to the previous page by clicking here and enter a correct value.

If you do not know the correct keyword, then contact the appropriate person in your company to obtain one.

FIG. 5

4. Chronological Information —220

150

| | | |
|---|---|---|
| When did you first conceive of the innovation? | | —230 |
| What is the date of the first written description of the innovation? | | —232 |
| When was or will the innovation be first disclosed, demonstrated or described to persons who are not employees of Company? Include if the innovation has been described in any type of publication released outside of Company (either an electronic or a printed publication). If so, give details. (e.g., trade show, which publication, etc.) | | —234 |
| Have steps been taken to put the innovation into use, either outside Company or in our own operations? If so, give details. | | —236 |
| When was or will a product or service incorporating the innovation be first offered for sale or license (including as a Beta version)? | | —238 |

5. Background of the Innovation (what led you to the innovation)  —222

6. List any "Prior Art" (see instructions) - mod  —224

7. Miscellaneous

—226

| | | |
|---|---|---|
| Were you working as part of a government contract at the time you initially thought of or tested the innovation? If so, state the title, number and date of the government contract. | | —240 |
| Are you or any of your team aware of any patents issued or filed in this area? | | —242 |
| Has a search pertaining to this innovation been conducted to learn how it differs from previously known information and, if so, where are the results? | | —244 |

Next Page  —246

FIG. 10

Detailed Instructions

2. Brief Summary of the Innovation.

Describe the innovation and state how its features and performance differ from previous systems or methods that you know about.

Close

FIG. 11

Detailed Instructions

4. Chronological Information.

These questions relate to the dates on which the innovation was first conceived and reduced to practice, and the dates of first disclosure or sale of the innovation.

Close

FIG. 12

Detailed Instructions

6. "Prior Art"

Please list all publications (printed or electronic), other (prior) patents, commercially available products or other sources of public knowledge (known as "prior art") of which you are aware which: (i) describe the extent of the already-public knowledge; (ii) describe the shortcomings of the prior art; or (iii) were considered by you for any purpose in arriving at your innovation. Also, identify any related company work, innovation disclosures, pending patent applications or patents.

Close

FIG. 13

IDEAS>Questionnaires>Edit Document

- 150
- 152

| Disclosure Form | Patent Assessment | Intrinsic Value | Competitive Value | Overall Assessment |
|---|---|---|---|---|
| 154 | 156 | 158 | 160 | 162 |

Home — 84

Questionnaires
1. Disclosure Form — 192
2. Patent Assessment — 194
3. Intrinsic Value — 196
4. Competitive Value — 198
5. Overall Assessment — 200

Save As Draft — 202

Submit Questionnaire — 204

Browse — 206
Questionnaires

Help — 92

2. Is the innovation sufficiently valuable to warrant seeking a patent?

INTRINSIC VALUE
Please review the factors listed in the following table. Considering each factor for the innovation in question, rank whether the factor is, for your innovation, a: -5 (strong negative), -2 (slight negative), 0 (neutral/inapplicable), +2 (slight positive), or +5 (strong positive)

| Factor | Weight (-5 to +5) | Factor | Weight (-5 to +5) |
|---|---|---|---|
| CUSTOMER ATTRACTIVENESS | | 19. Market Dependence/Fluctuating Market | ▼ — 320 |
| 1. Cost to Customer | ▼ | 20. Cross Marketing Opportunity | ▼ — 322 |
| 2. Speed of Results | ▼ | 21. Attractive Marketing Campaign/Difficult to Promote | ▼ — 324 |
| 3. Ease of Use/Viewability | ▼ | 22. Related Product/Service Addability | ▼ — 326 |
| 4. Provides Convenience | ▼ | 23. Rival Technology | ▼ — 328 |
| 5. Promotes Safety/Health/Ecology/Social Benefit | ▼ | 24. Product Redefines Market | ▼ — 330 |
| 6. Reliability | ▼ | | |
| 7. Requires New Equipment | ▼ | PRODUCTION FACTORS | — 280 |
| 8. Precision of Results | ▼ | 25. Margins/Profitability | ▼ — 332 |
| 9. Quality/Functionality/Performance | ▼ | 26. Regulatory/Compliance Hassle | ▼ — 334 |
| 10. Satisfies Existing Need/Deficiency | ▼ | 27. Development Effort/Cost | ▼ — 336 |
| 11. Quickly Obsolete/Instant Anachronism | ▼ | 28. Compatibility w/existing services/products | ▼ — 338 |
| 12. Too Advanced Technically/Substantial Learning Curve | ▼ | 29. Ease/Difficulty of Production/Delivery/Distribution | ▼ — 340 |
| | | 30. Product Life Cycle | ▼ — 342 |
| MARKET FACTORS | | 31. Ongoing Servicing Needs | ▼ — 344 |
| 13. Salability | ▼ | 32. New Production Equipment Required | ▼ — 346 |
| 14. Market Size/Lack of Market | ▼ | 33. Internal Inertia to Overcome | ▼ — 348 |
| 15. Trend of Demand | ▼ | | |
| 16. Difficulty of Market Penetration/Entrenched Competing Products | ▼ | OTHER CONSIDERATIONS | — 282 |
| 17. Potential Competition | ▼ | | ▼ |
| 18. Excitement | ▼ | | ▼ |
| Total Positives | | — 350 | |
| Total Negatives | | — 352 | |
| Net Positive/Negative | | — 354 | |

FIG. 15

IDEAS>Questionnaires>Edit Document  — 370                                152

| Disclosure Form | Patent Assessment | Intrinsic Value | Competitive Value | Overall Assessment |
|---|---|---|---|---|
| 190 | 154 | 156 | 158 | 160 | 162 |

Home — 84

Questionnaires
 1. Disclosure Form — 192
 2. Patent Assessment — 194
 3. Intrinsic Value — 196
 4. Competitive Value — 198
 5. Overall Assessment — 200

Save As Draft — 202

Submit Questionnaire — 204

Browse — 206
Questionnaires

Help — 92

188

COMPETITIVE VALUE

Taking into account your rankings (individually, as well as overall positives, overall negatives, and total net) in the previous table, please answer the following questions as dispassionately as possible, using the following 1-5 scale: 1 = not very likely; 5 = extremely likely.

374 — A. How likely is company to use this innovation commercially?
     *Answer each of the following:*

1. Sold externally?
     a. If the answer to the previous question is rated 4 or 5, how likely is it that the use would be at large scale?

2. Used internally in the provision of services to customers?
     a. If the answer to the previous question is rated 4 or 5, how likely is it that the use would be at large scale?

3. Used solely internally by company?
     a. If the answer to the previous question is rated 4 or 5, how likely is it that the use would be at large scale?

376 — B. How likely is it that company competitors will make, use (internally or externally) or market the same or a similar innovation within the next five years?

378 — C. How likely is it that company or company's competitors will find it valuable to make, use or market the innovation 3 + years from now?

380 — D. If a company competitor made, used or marketed the same or similar innovation, how likely is it that you will learn that fact?

382 — E. Is it likely that competitors are currently making, using or marketing the same or a similar innovation?

384 — F. Is it likely that, if your competitor had this innovation and could prevent you from using it, it would hurt your business in a significant manner?

386 — G. If you could block your competitor from using the innovation would that give your business a significant competitive edge?

Total Score (A-G) ☐
388

FIG. 16

- 84 — Home
- 86 — Managers' Innovation Handbook
- 88 — New Questionnaire
- 114 — Questionnaires
  - 94 — By Submittor
  - 96 — By Title
  - 116 — By Business
  - 98 — By ID
  - 100 — By Date
  - 102 — By Inventor
- 118 — Ratings
  - 120 — By Intrinsic Value
  - 122 — By Competitive Value
  - 124 — By Overall Assessment
- 92 — Help

112

430

Managers Innovation Handbook

III. OVERVIEW

A. What is a Patent?

A patent permits the patent owner to exclude others from making, using, or selling the innovation covered by the patent for the term of the patent. The government grants a patent in consideration of the inventor(s) providing a complete and operative disclosure of a new, nonobvious and useful innovation in sufficient detail to permit others to make and use it after the patent expires. The term of a regular or "utility" patent is 20 years from filing. Patents must be applied for and issued by the U.S. government (and/or other appropriate jurisdictions) to be valid.

Contrary to a common misperception, a patent does not give the patentee the right to make, use or sell the innovation, but *only the right to exclude others* from doing so. Thus, if the company obtains a patent on an *improvement* to a process, it may not necessarily have the right to use the process itself if *the process is covered by a patent of another party*. However, the patent would give the company the right to *prevent the other party from using the improvement*. This right to exclude use of such improvements means that obtaining a patent on even modest "bells and whistles" improvement can be strategically valuable to the Company.

B. What is Patentable?

Patents are issued only for *new* (or improved) products or processes that are nonobvious and useful. Each of these terms is loaded with legal meaning, and a patent attorney will help make the final judgment whether a development is patentable. However, the following discussion should help your team make the initial determination as to potential patentability.

NOTE: Processes practiced just within the Company (i.e., back office operations or quality processes) are eligible for patent protection review.

1. Novelty ("Prior Art")

In general, an innovation is *new* (or "novel") if it is different from what is already publicly known. The body of already-public knowledge which serves to defeat novelty is referred to in patent "jargon" as the "prior art." Generally, prior art in the U.S. includes the following:

Prior Patents

Publications (predating the conception of the innovation)

Commercial Activity (offers for sale or license of the innovation)

Public Disclosures (public uses, public displays, and public demonstrations of the innovation, such as at trade shows or before customers.)

Moreover, regardless of whether any prior art exists, you (or your team) must

METHODS AND SYSTEMS FOR MANAGING INVENTION DISCLOSURES

BACKGROUND OF THE INVENTION

This invention relates generally to an invention disclosure management system and, more specifically, to network based methods and systems for gathering, disseminating and managing invention disclosures.

Many companies encourage employees to submit, for consideration by management, information related to innovations that such employees conceive and that are related to company business. Especially in large companies with very active invention disclosure processes, a significant amount of information typically is submitted on a wide variety of innovations.

At least some known invention disclosure processes are paper-based, and a paper form often is provided to innovators to utilize in connection with submitting information related to innovations. The information submitted for each innovation typically includes a description of the innovation, along with some details regarding possible or actual use of the innovation.

The submitted information for each innovation is collected and retained in an invention disclosure file, or docket, and at regularly scheduled intervals, e.g., once per quarter, a cross-functional team meets to review each disclosure and to assign a rating to each disclosure. Since the invention disclosure materials are submitted in paper form, the team members as a group typically review each file during the meeting rather than prior to the meeting at a convenient time. As a result, the cross functional team typically makes a decision with very little time to thoroughly consider all potential aspects of an innovation.

Also, while meeting once per quarter or once per month may be sufficient in long cycle businesses in which innovations have a long useful life, e.g., longer than 5 years, meeting once per quarter or even once per month may not be sufficient in short cycle businesses in which innovations have a shorter useful life, e.g., less than 5 years. Losing even 3 months due to internal administration, e.g., coordinating a docket review meeting with the travel schedules and other commitments of the cross functional team members or in getting a patent application filed, a short cycle business can result in loss of significant value in any resulting patent.

Further, although docket rating systems can vary from company to company, a typical rating system has defined ratings, e.g., rating A, B, C, or D, that correlate to specific actions. For example, for an A rated docket a patent application should be filed on the subject innovation. If a docket is B rated, then additional information should be obtained so that such information can be reviewed at a next docket review meeting. Of course, the rating assigned to each docket typically is heavily based on the knowledge and experience of members of the cross functional team. Even when an innovator submits information relating to the importance of an innovation, such information often is qualitative in nature and sometimes perceived as being less than completely objective.

Moreover, in large companies with multiple locations, paper based systems do not facilitate sharing of information across the locations. For example, if a paper based invention disclosure form is submitted at one location to a designated patent coordinator, it is unlikely that other employees at the other locations will learn about the submitted disclosure unless a formal information exchange process is in place. There certainly can be benefits from sharing information regarding innovations across multiple businesses of a large corporation, e.g., to facilitate an integrated patent application filing strategy.

BRIEF SUMMARY OF THE INVENTION

Methods and systems for submission, rating, and tracking invention disclosures are described herein. In an exemplary embodiment, the method incorporates an invention disclosure template to be used by innovators for submission and scoring of an invention disclosure. The invention disclosure template is configured with multiple assessment levels and includes help messaging and other dynamic help functions. For example, one assessment level exists where business counsel or managers can make entries concerning the value of the invention to the company. In addition, yet another assessment level exists where only intellectual property counsel, inside or outside the company, can make privileged entries or comments regarding the invention. Specifically, the entries and comments can be entered and stored in such as way as to preserve the attorney—client privilege with respect thereto.

The method disclosed includes the steps of receiving invention disclosure information from a user, for example an innovator or intellectual property counsel, comparing the received invention disclosure information with previously received invention disclosure information, and sorting invention disclosures based on criteria input by a person making the disclosure as well as by multiple reviewers.

BRIEF DESCRIPTION OF THE DRAWINGS

FIG. 3 is an example of a user logon screen;

FIG. 4 is an example user registration screen;

FIG. 5 is an example user registration error message screen;

FIG. 10 is a second portion of an invention disclosure form user interface;

FIGS. 11, 12 and 13 are exemplary examples of title block pop-up windows;

FIG. 15 is an intrinsic value user interface;

FIG. 16 is a competitive value user interface;

FIG. 18 is a sampling of a manager's handbook;

FIG. 25 is a portion of a user interface which is presented to a high level reviewer of invention disclosures who has chosen a disclosure to browse and/or edit;

DETAILED DESCRIPTION OF THE INVENTION

One exemplary embodiment of systems and methods that facilitate integrated Internet-based information management related to invention disclosure management within an entity are described below in detail. The systems and processes facilitate, for example, electronic submission of information, automated extraction of information, and web-based assessment reporting and management of invention disclosures for internal system users. Other embodiments of the invention exist, which are not Internet-based, including non computer based systems, which are paper driven. The exemplary embodiment is described below.

The systems and processes are not limited to the specific embodiments described herein. In addition, components of each system and each process can be practiced independently and separately from other components and processes described herein. Each component and process can be used in combination with other components and processes.

The present invention, in one aspect and in one embodiment, is a computerized method for disclosure and management of invention disclosures. The computerized method reduces the manual effort required to manage an invention disclosure docket, reduces the potential for mistakes in handling the docket and provides enhanced capability for value evaluation of individual invention disclosures, quantity tracking of invention disclosures and quality analysis of invention disclosures.

Figure 1:
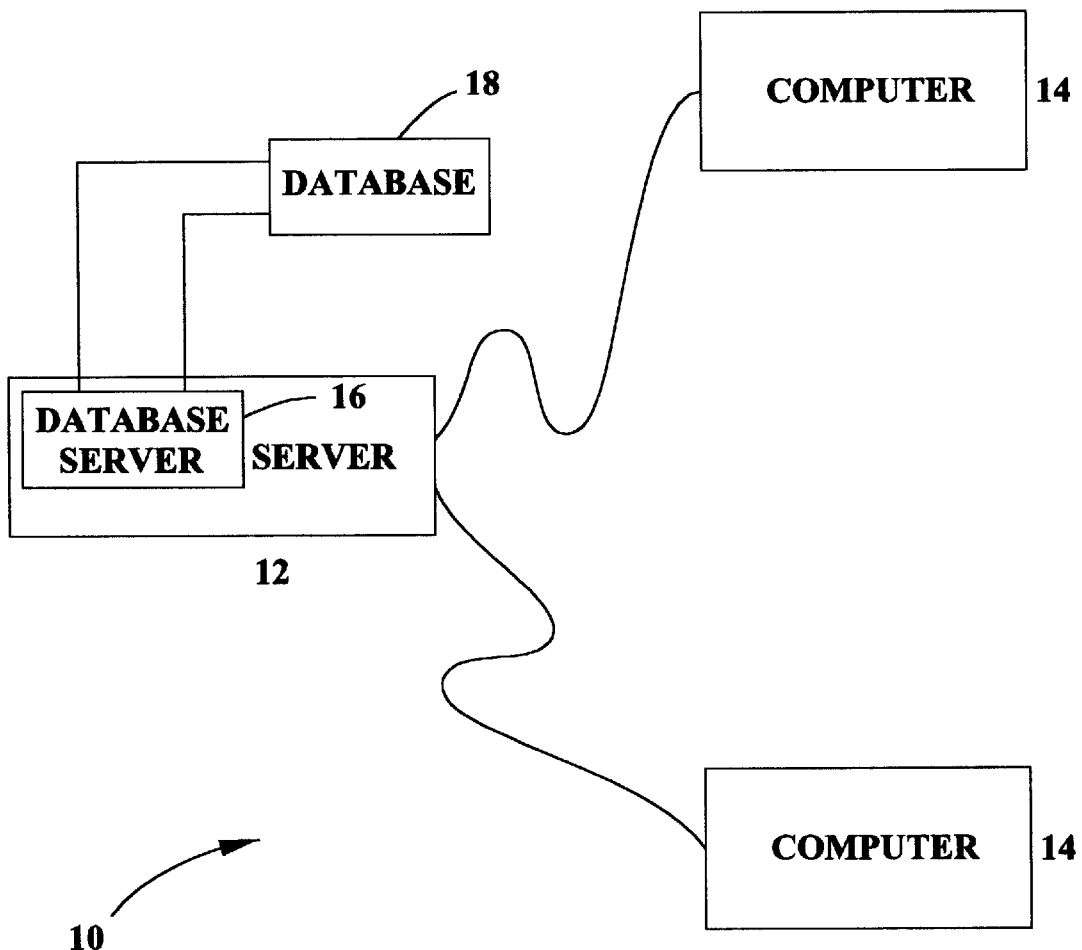
FIG. 1 is a system block diagram.

FIG. 1 is a block diagram of a system 10 that includes a server subsystem 12, sometimes referred to herein as server 12, and a plurality of customer devices 14 connected to server 12. In one embodiment, devices 14 are computers including a web browser, and server 12 is accessible to devices 14 via a network such as an intranet or a wide area network such as the Internet. In an alternative embodiment, devices 14 are servers for a network of customer devices.

Devices 14 are interconnected to the network, such as a local area network (LAN) or a wide area network (WAN), through many interfaces including dial-in-connections, cable modems and high-speed lines. Alternatively, devices 14 are any device capable of interconnecting to a network including a web-based phone, wireless web, satellite or other web-based connectable equipment. Server 12 includes an invention disclosure database server 16 connected to a centralized database 18 containing invention disclosure information on multiple invention disclosures. In one embodiment, centralized database 18 is stored on database server 16 and is accessed by authorized users at one of customer devices 14 by logging onto server sub-system 12 through one of customer devices 14. In an alternative embodiment centralized database 18 is stored remotely from server 12.

Figure 2:
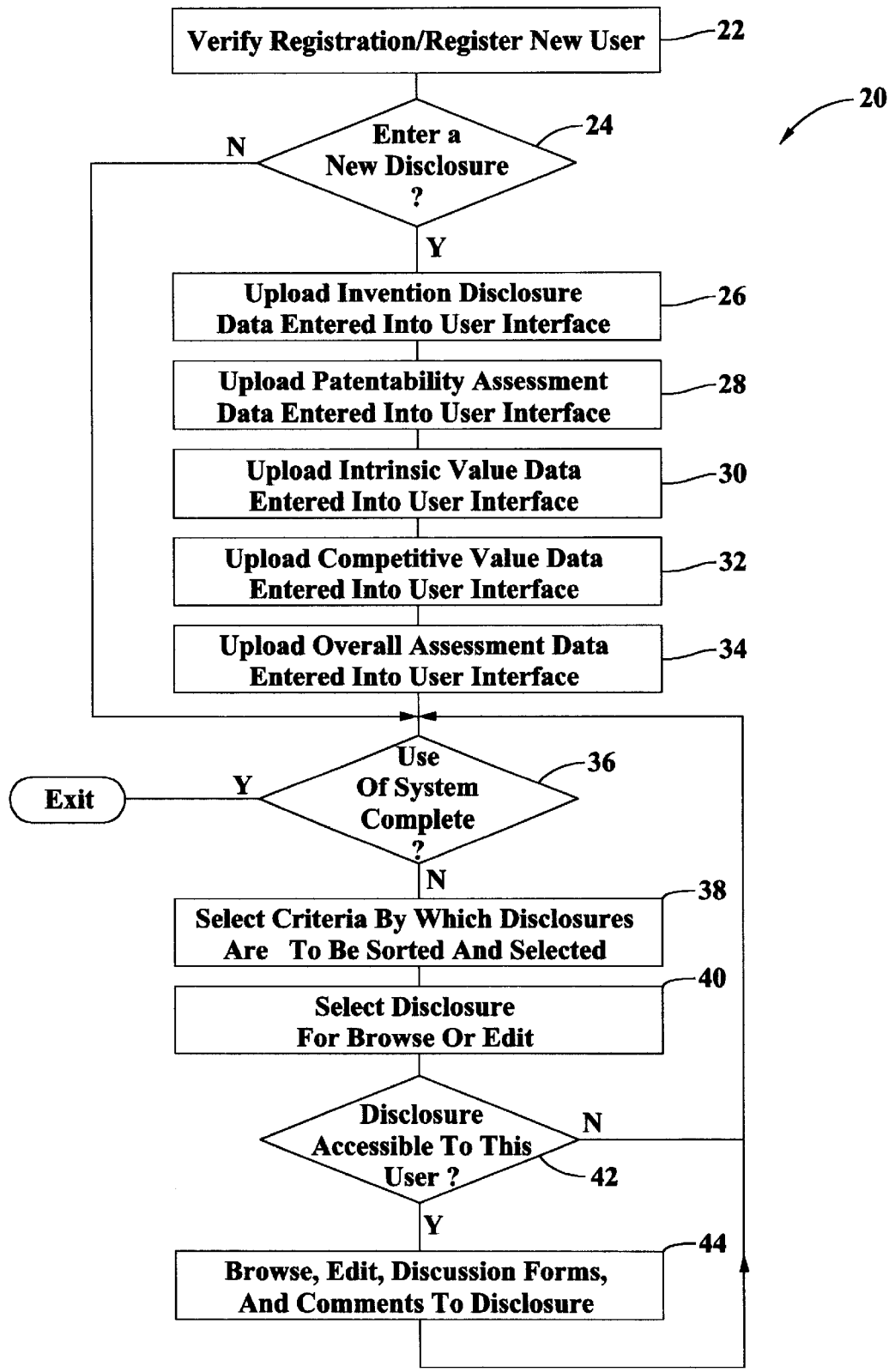
FIG. 2 is a flowchart showing process steps executed in an invention disclosure management system.

FIG. 2 is a flowchart 20 which describes operation of invention disclosure management system 10. When a user attempts to login to system 10, system 10 verifies 22 registration or alternatively prompts the user to register as a new user. In one alternative embodiment, a system manager manually sets up new accounts. After a successful login, the user chooses 24 to enter data for a new disclosure, edit existing disclosures or to add comments to existing disclosures. In another embodiment, not shown in flowchart 20, a user can attach files, stored in any of a number of well known file formats, to an invention disclosure if the user feels the files are necessary to fully disclose the invention.

To add a new invention disclosure into system 10, system 10 uploads 26 invention disclosure data entered into the user interface by the user. System 10 further uploads 28 a patentability assessment entered into the user interface by the user. An intrinsic value assessment of the invention is entered by the user into the user interface and is uploaded 30 to system 10. The user also enters competitive value data into the user interface which is uploaded 32 by system 10. In addition, an overall assessment is uploaded 34 to system 10 after being entered into the user interface by the user. After a disclosure is uploaded to system 10, the user decides whether use of system 10 is complete 36.

After a disclosure has been uploaded to system 10, the disclosure can be tracked, reviewed and updated in a number of ways that will be explained below. However to track, review or update a disclosure, either after entry, or after a successful login, the user can select 38 criteria by which system 10 will download and display the disclosures, after which a disclosure is selected 40 for browsing or editing. As will be explained later, there are restrictions as to which disclosures and portions of disclosures (fields) are considered to be viewable by a particular user. Therefore system 10 checks 42 the level of restrictions, field by field, that have been placed on the user. If the user is authorized for the browsing, editing, discussion forums and commenting with regard to the selected disclosure, system 10 downloads and displays 44 the portions of the database containing the disclosures or fields within the disclosures which can be accessed and edited by the user as will be explained in further detail below.

FIG. 3 is an exemplary embodiment of a login user interface 50 according to one embodiment of the present invention. User interface 50 includes data entry fields for entering user information required to be uploaded to server 12 (shown in FIG. 1), to verify if the user has a user account for access to the databases 16 of system 10. Included in user interface 50 is a username entry field 52, a password entry field 54 and a link 56 which non-registered users can select to request an account on system 10. After entry of a username and a password, selection of an entry link 58 uploads the user name and password to server 12.

FIG. 4 is an exemplary example of a account request user interface 60. Data entry fields 62 are filled in by a user requesting a user account and uploaded to server 12 when complete by selection of link 64. In one embodiment system 10 is configured to verify whether the user requesting the user account should have access to system 10. In another embodiment, an upload of data from data entry fields 62 to server causes a notification to be sent to a system manager, who decides whether the requester should be assigned a user account. In alternative embodiments, the user requesting an account may input a desired password or there may be a password assigned by the system or the system manager. If the user forgets their password, there is, in one embodiment, a link the user can select that notifies system 10, that the user has forgotten their password. The system will E-mail to the user a temporary password.

In an embodiment not shown in FIG. 4, a user requesting an account may be required to enter their social security number, for use in award or compensation programs for company inventors. In another embodiment not shown in FIG. 4, the user requesting an account will enter a project or a laboratory designation or other designating data, which will cause an attorney to be linked to the user. Upon submission of an invention disclosure, described below, the linked attorney will be notified via E-mail. FIG. 5 is an example of a user interface 70 displayed when a user requesting a user account has not entered data into any number of required data entry fields of the data entry fields 62 (shown in FIG. 4).

Figure 6:
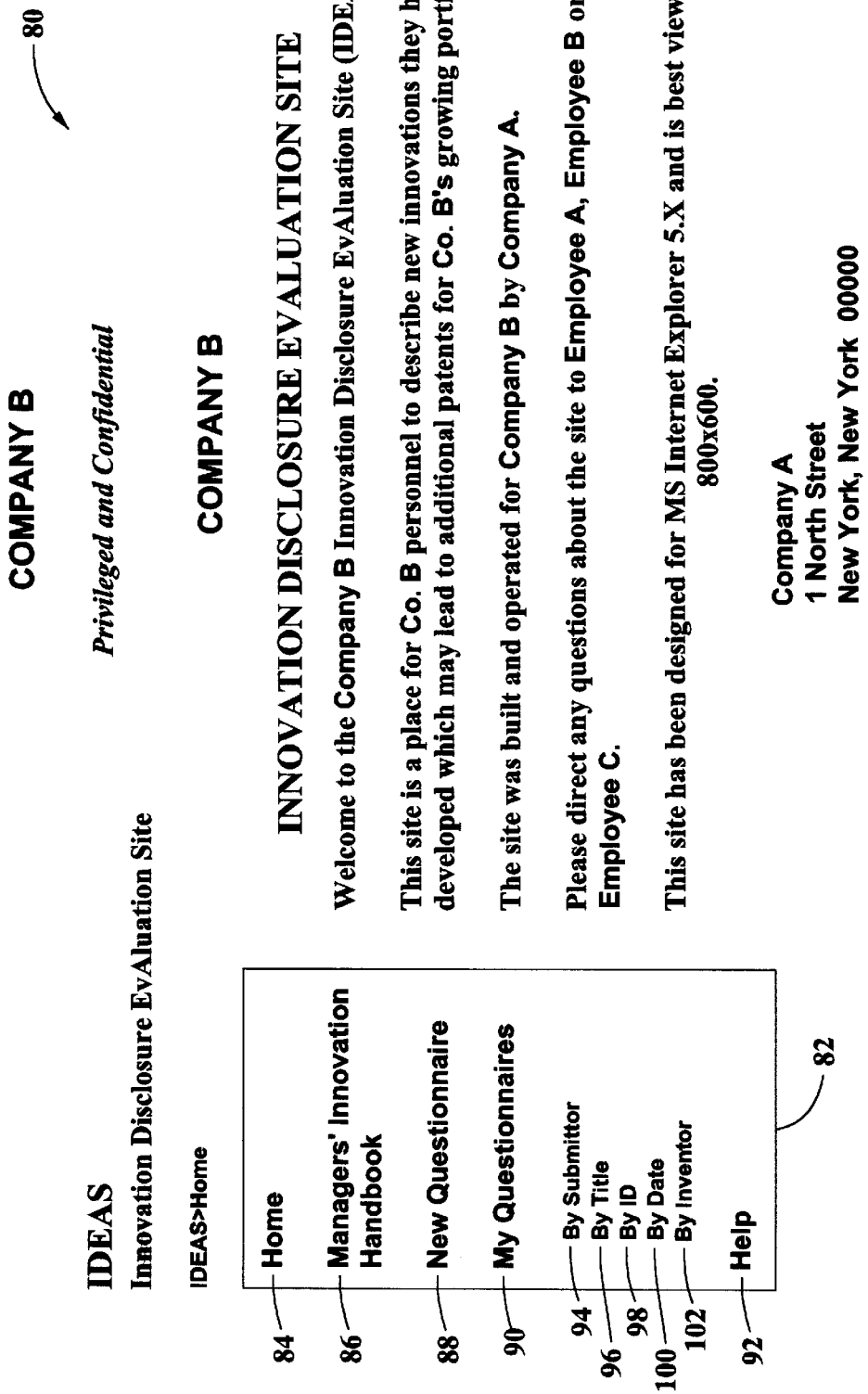
FIG. 6 is a user interface displayed after a successful login by a user.

FIG. 6 is a user interface 80 presented to a user after a successful login onto system 10 (shown in FIG. 1). It is to be noted that user interface 80 is presented to a user who has access rights which allow the user to enter data disclosing an innovation. Other user interfaces are presented to users which have higher access levels, for example, a user interface presented to a business reviewer of invention disclosures and a user interface presented to an attorney user, for example an intellectual property counsel. Business reviewer and attorney user interfaces are described below. User interface 80 includes a link box 82 which further includes a home page link 84, a manager's handbook link 86, a new questionnaire link 88, a my questionnaires link 90 and a help link 92. Selection of home page link 84 returns a user to user interface 80. Selection of manager's handbook link 86 presents to a user an online handbook. In another embodiment, manager's handbook includes other links (not shown in the Figures) which allow a user to select and jump to a section of the handbook the user considers pertinent. In addition, based on which user interface the user is viewing, selecting help to open the manager's handbook causes the system to go to a section of the handbook configured to be most pertinent to the user interface the user is viewing. Selection of new questionnaire link 88 presents to a user a user interface for the entry of data regarding a new innovation. My questionnaires link 90 is, in the embodiment shown, a heading for a series of sublinks where a user can select from existing questionnaires which are sorted by selecting one of, submittor 94, title 96, ID 98, date 100, and inventor 102 which will be explained in further detail below. A help link 92 invokes a help program built into system 10.

Figure 7:
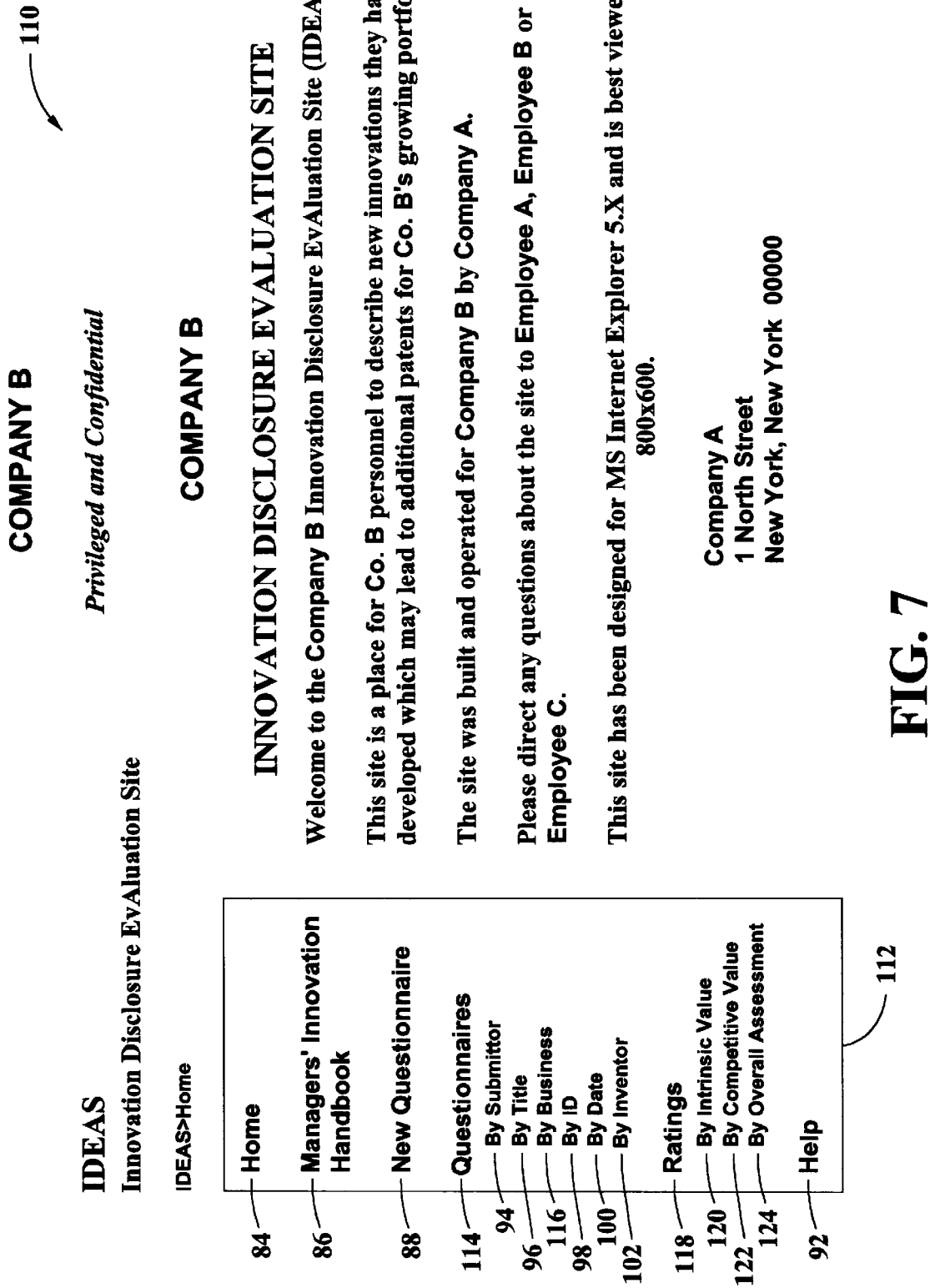
FIG. 7 is a user interface displayed after a successful login by a business reviewer.

FIG. 7 is a user interface 110 presented to a business reviewer user after a successful login onto system 10 (shown in FIG. 1). User interface 110 includes a link box 112. Components of link box 102 which are identical to components of link box 82, shown in FIG. 6, are identified in FIG. 7 using the same reference numerals as used in FIG. 6. In addition link box 112 includes a questionnaires link 114 which includes sublinks as described above and an additional sublink, a by business 116 sublink. It is to be noted that a difference between user interface 110 and user interface 80 is the difference between my questionnaires link 90 and questionnaires link 114, which is, that a user presented with user interface 80 is restricted to accessing those questionnaires in which he or she has entered into system 10. Also included in link box 112 is a ratings category 118, which includes sublinks that allow an authorized user to browse and view existing questionnaires sorted by one of intrinsic value 120, competitive value 122 and overall assessment 124.

Figure 8:
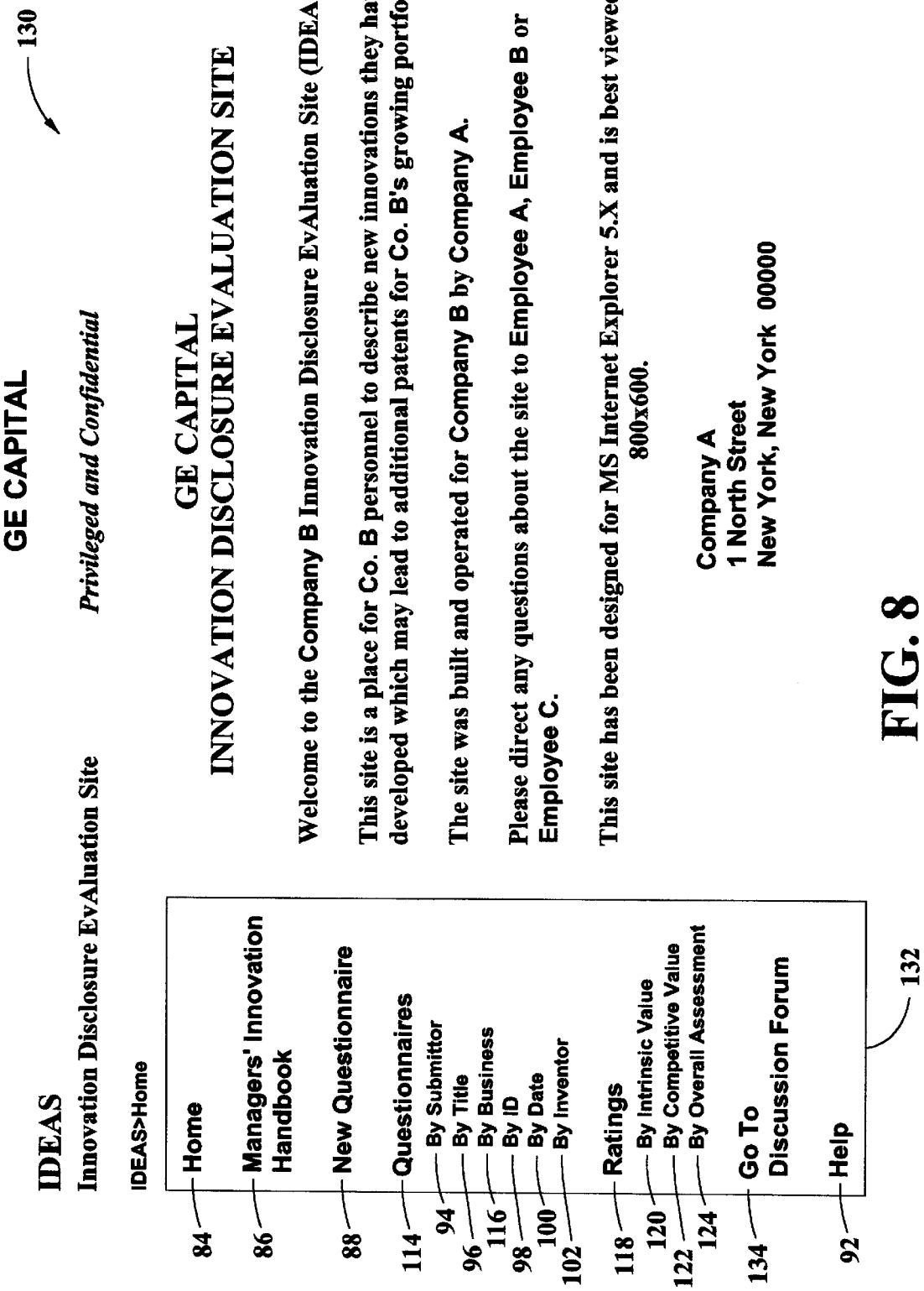
FIG. 8 is a user interface displayed after a successful login by an attorney user.

FIG. 8 is a user interface 130 presented to an attorney user after a successful login onto system 10 (shown in FIG. 1). User interface 130 includes a link box 132. Components of link box 132 which are identical to components of link box 82, shown in FIG. 6, and link box 112, shown in FIG. 7, are identified in FIG. 8 using the same reference numerals as used in FIGS. 6 and 7. In addition link box 132 includes a discussion forum link 134 which, when selected, allows an attorney user to enter a discussion forum where attorney users can enter comments about invention disclosures. Discussion forums are described in further detail below.

Figure 9:
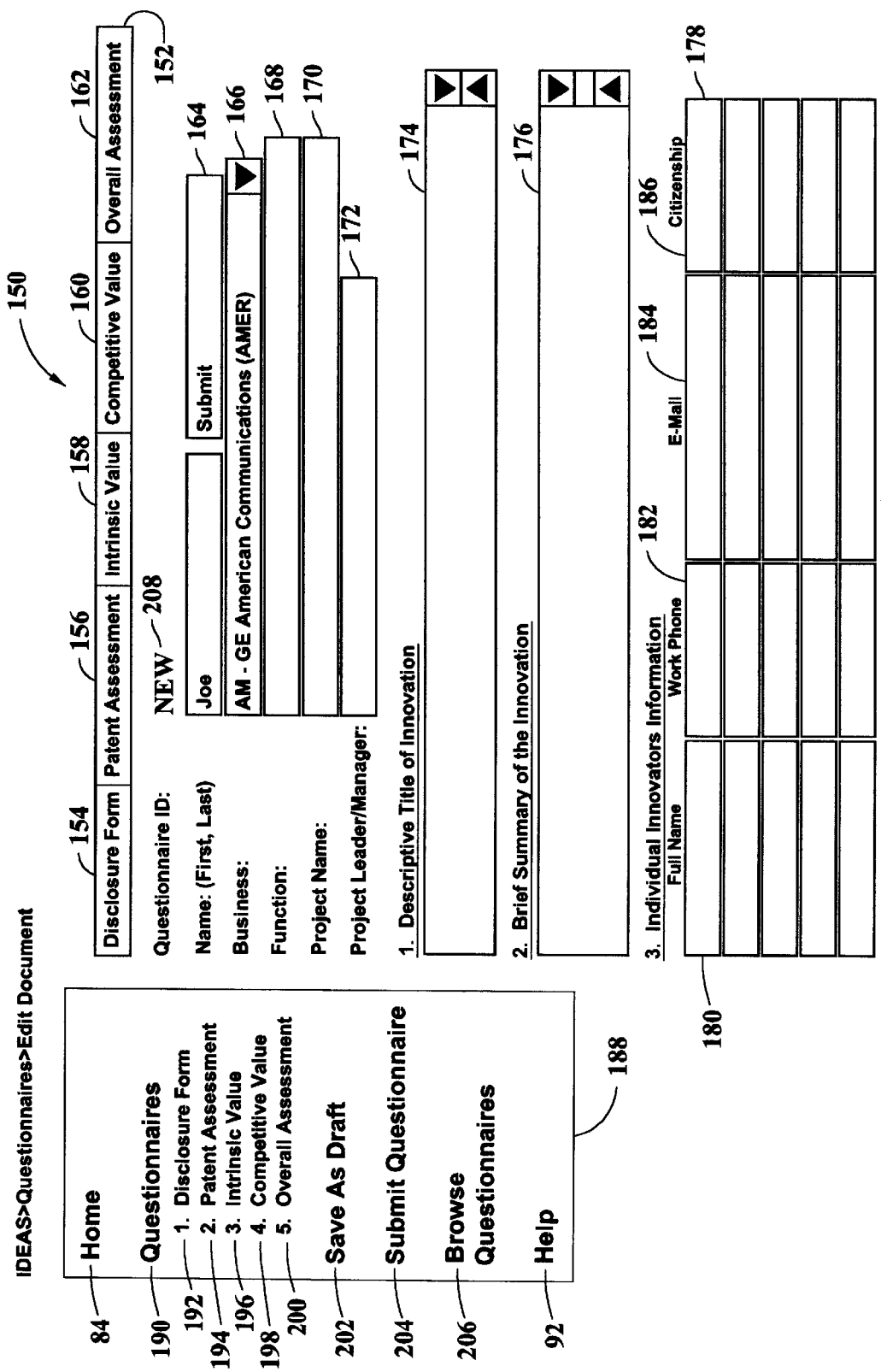
FIG. 9 is a first portion of an invention disclosure form user interface.

After a registered user, who is not a business reviewer or attorney user, logs in to system 10, and selects to enter a new questionnaire, an invention disclosure form user interface is downloaded from server 12 and displayed on device 14. FIG. 9 is a first portion of an invention disclosure form user interface 150 or questionnaire. Included in invention disclosure form user interface 150 is a selection bar 152, through which system 10 is configured to recognize user selections of various user interfaces. As shown in FIG. 9, an invention disclosure form tab 154 has been selected from selection bar 152, notifying system 10 that invention disclosure form user interface 150 is to be displayed as shown. Other choices contained within selection bar 152 include a patent assessment tab 156, an intrinsic value tab 158, a competitive value tab 160, and an overall assessment tab 162, which are described below in further detail.

In one embodiment, the first portion of invention disclosure form user interface 150 further includes entry fields for a user's name 164, which business entity 166 the user is associated with, the user's function 168 or job title, a project name 170, name of a project team leader 172, a descriptive title of innovation data field 174, a brief summary of the innovation field 176 and a plurality of innovators information 178 data entry fields. Innovators information 178 data entry fields contain personal information about an individual innovator or members of an innovative team. Such personal information fields would typically include, but are not limited to names 180, work telephone numbers 182, E-mail addresses 184 and citizenship 186. In an alternative embodiment (not shown), fields exist which indicate the user that has last edited information fields. In still another embodiment (not shown) a field exists where the user can input the components of a corporation that he or she feels would be interested in the innovation being disclosed. Upon upload of the entered corporation component information, the user will be prompted with various keywords and product lines which can be selected as possibly being affected by the innovation.

A link box 188 within user interface 150 includes a questionnaire link 190 enabling a user to link to, or select any of the questionnaire interfaces associated with those delineated in describing selection bar 52 above by selecting one of sublinks 192, 194, 196, 198 and 200. Components of link box 188 which are identical to components of link box 82, shown in FIG. 6, are identified in FIG. 9 using the same reference numerals as used in FIG. 6. In addition, link box 188 includes a save draft link 202 which enables a user to save changes made to an invention questionnaire without being submitted as an invention disclosure or being assigned a questionnaire ID number. A submit questionnaire link 204 which enables a user to save changes made to an invention questionnaire, submit the questionnaire as an invention disclosure, and assign the invention disclosure a questionnaire ID number. ID numbers typically are assigned sequentially, however, other methodologies can be utilized to assign such ID numbers. A browse questionnaires link 206 enables a browse of previously stored invention disclosure questionnaires. Selection of link 206 causes system 10 to download and display a list of invention disclosures within database 16 that have been entered by the user and those in which the user has been named as an innovator. In one embodiment, when a user elects to save changes to the questionnaire using the save as draft link 202 or the submit questionnaire link 204 in link box 188, the invention disclosure user interface is closed and there is displayed a textual link (not shown) which the user can select to browse existing questionnaires. System 10 uses the information entered into the user's interface described above to create and add to an invention disclosure database stored within system 10.

FIG. 9 also includes a questionnaire ID 208. Questionnaire ID 208 is a number, in one embodiment a docket number, automatically assigned by system 10. Questionnaire ID 208 is shown in FIG. 9 as being "NEW" since, in one embodiment, a number is not assigned, and therefore not displayed, until a user of system 10 instructs system 10 to submit the questionnaire using link 204. In another embodiment, a questionnaire ID number is assigned when the user selects one of the other choices contained within selection bar 152 such as patent assessment tab 156, intrinsic value tab 158, competitive value tab 160, or overall assessment tab 162. Once a user has selected one of the tabs from selection bar 152, listed above, and afterwards selects disclosure form tab 154, a questionnaire ID 208 will be displayed. In alternative embodiments, before a questionnaire ID is assigned to a disclosure and the entered information is stored in the database, certain of the data entry fields described in FIG. 9 are required to have data entered. In addition, questionnaire ID 208 is assigned according to business unit or client thereby allowing data tracking and sorting based on assigned questionnaire IDs.

In one embodiment, required data for submitting a questionnaire as an invention disclosure includes name 164, project manager 172, descriptive title 174, brief summary 176 and at least one full name of an innovator 180 and their E-mail address 184. In another embodiment, upon submission of the questionnaire, an E-mail is sent to the named innovators informing them that they have been named as an innovator in an invention disclosure questionnaire. In yet another embodiment, if the named innovators are not users of the disclosure management system, those innovators will also be sent an E-mail inquiring if that innovator would like to become an authorized user of system 10. In still another embodiment, upon submission of the questionnaire, E-mails are sent to the linked attorney (as described above in FIG. 4), a lab manager (if applicable) and a docketing clerk.

FIG. 10 shows a second portion of the invention disclosure form user interface 150 partially shown in FIG. 9. User interface 150 includes data entry fields for innovation chronological information 220, innovation background information 222, a "prior art" listing 224 where knowledge of the inventors' awareness of, for example, patent activity, technical publications, and competitor products in the field of the innovation is to be entered, including shortcomings of what currently exists in the field, and a miscellaneous section 226 which includes data entry fields relating to the development of the innovation. Innovation background information 222 is a field where background work in the project that leads to the innovation is described, for example, the technical or business field to which the development relates. Also included is what problem, if any, the innovation solved, or what was lacking in previous devices, processes, business methods, etc., that prompted the development.

Chronological information 220 data entry field includes fields for user entry prompted by questions presented to the user pertaining to dates of the innovation which are critical for obtaining patent protection for an invention. Chronological information 220 data entry fields include a conception date field 230, a written description date field 232, a disclosure date field 234, an innovation use data field 236 and offer for sale or license data entry field 238. User entered data from second portion of the invention disclosure form user interface 150 is also used by system 10 in creating and adding to the invention disclosure data base stored within system 10.

Data entry fields in miscellaneous section 226 include a government contract data entry field 240 where, if applicable, information relating to innovations developed while under government contract. A patent awareness data entry field 242 is used by system 10 to track any user knowledge concerning previous patents in the same subject area as the present innovation. In addition, a prior art search data entry field 244 is used by system 10 to track information, entered by the user, that has been gathered from a source or sources and how the information differs from the present invention development area. A next page link 246, when selected by the user, causes a next page of an invention disclosure questionnaire to be displayed. In the embodiment shown in FIG. 11, the next page is a patent assessment page, described below in FIG. 14. In an alternative embodiment, fields exist which notify inventors (or others) entering information regarding an innovation of the duty of disclosure as set forth in 37 C.F.R. § 1.56.

Referring again to FIGS. 9 and 10, several of the enumerated data entry fields include title blocks which are configured as links. Data entry fields which include title blocks configured as links, in the embodiment shown in FIGS. 3 and 4 are descriptive title of innovation data field 174, brief summary of the innovation field 176, inventor's information 178, chronological information 220, background information 222, "prior art" listing 224, and miscellaneous section 226. Selecting any one of the title blocks, in one embodiment, causes pop-up windows to be displayed with a short description of what type of data should be entered into the data entry fields. FIGS. 11, 12, and 13 are three exemplary examples of pop-up windows that are displayed when respective title blocks have been selected. In another embodiment, the user can select a help link 92, shown in FIG. 9, and find the same information that is within the pop-up windows, through use of help menus (not shown).

Figure 14:
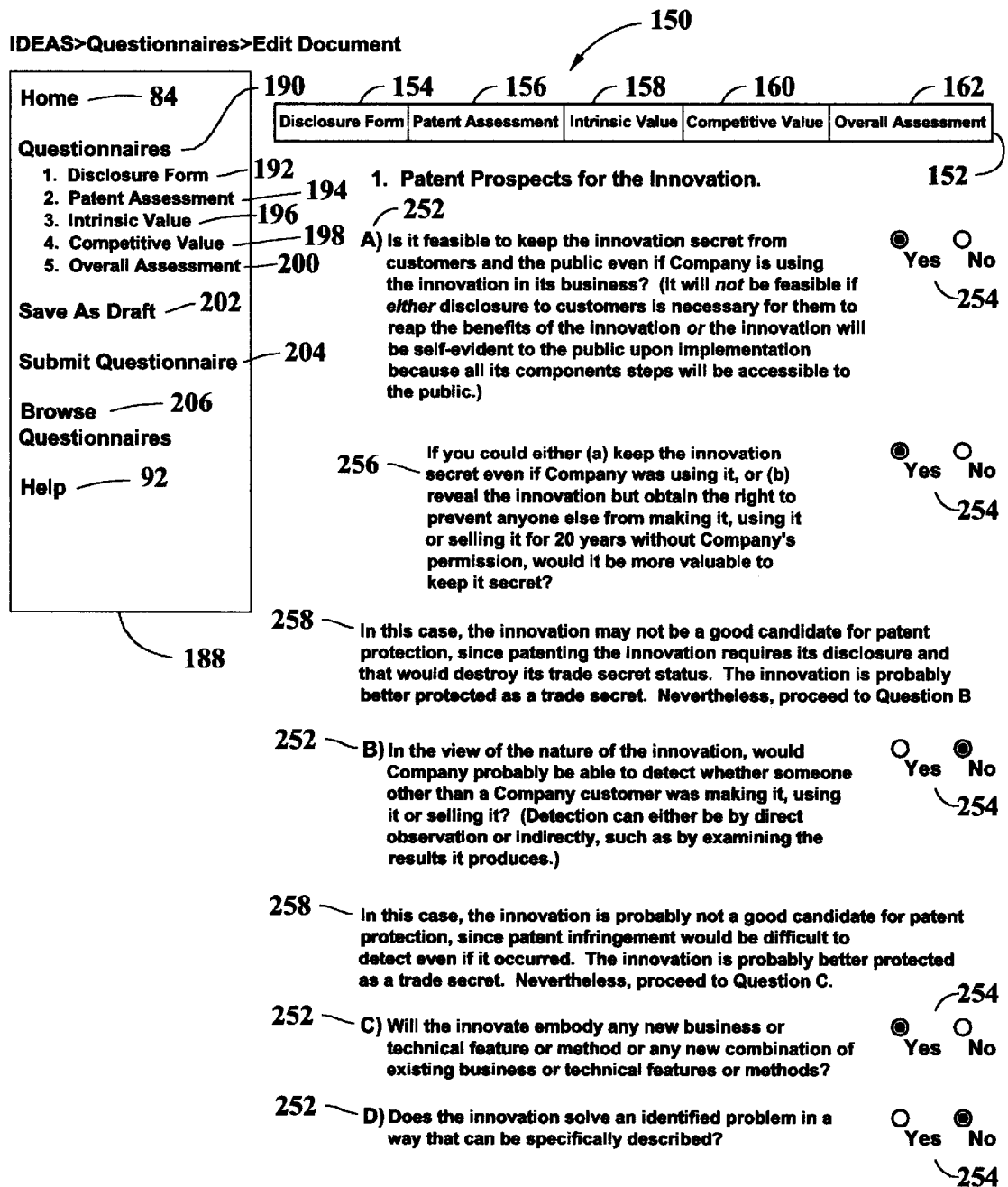
FIG. 14 is a patentabilty assessment user interface.

Referring to FIG. 14, a patentability assessment user interface 250 is downloaded and displayed on client system 14 when system 10 has recognized that a user has selected patent assessment tab 156 of selection bar 152 or has selected next page link 246 (shown in FIG. 10). Components of user interface 250 which are identical to components of user interface 150, shown in FIG. 9, are identified in FIG. 14 using the same reference numerals as used in FIG. 9. Patentability assessment user interface 250 contains a series of questions 252, in the embodiment shown questions A through D, regarding development and use of the invention where system 10 uses data entry fields 254 which restrict the user to entering "yes" or "no" answers to the series of questions. Depending on which answer "yes" or "no" the user selects, secondary questions 256 may be displayed which also use data entry fields 254 restricting the user to entering "yes" or "no" answers to secondary questions 256. In addition, depending on the answers selected, comment blocks 258 may be displayed which advise the user as to the advisability of pursuing patent protection for the innovation. In one embodiment, not shown in the Figure, user interface 250 is configured with a next page link. Selection of next page link by the user causes an intrinsic value user interface (described in FIG. 15 below) to be displayed.

Referring to FIG. 15, an intrinsic value user interface 270 is downloaded and displayed on client system 14 when system 10 has recognized that a user has selected the intrinsic value tab 58 of selection bar 52. Components of user interface 270 which are identical to components of user interface 150, shown in FIG. 9, are identified in FIG. 15 using the same reference numerals as used in FIG. 9. Intrinsic value user interface 270 guides a user in assigning weights 272 from a list of weighting factors 274 to be stored by system 10. Assigned weights 272 of the weighting factors 274 are used by system 10 to determine if the innovation has sufficient value to warrant patent protection. In one exemplary embodiment, as shown in FIG. 15, weighting factors 274 are within multiple groupings, the groupings being a customer attractiveness grouping 276, a market factors grouping 278, a production factors grouping 280, and a miscellaneous factors grouping 282. Miscellaneous factors grouping 282 is included in system 10 to accommodate user entered factors that are not within existing groupings, but considered important enough to the user for entry into interface 270, so system 10 weights the miscellaneous factors in determining an intrinsic value. The individual weighting factors, described in detail below, are in one embodiment, configured as links, selection of which causes a pop-up window to be displayed explaining the weighting factor, similar to the pop-up windows shown in FIGS. 11, 12 and 13.

The weighting scale utilized, as well as the particular factors, can vary. For example, the weighting scale selected can be from 0–100. Also, additional factors, or fewer factors, can be utilized. Therefore, the description set forth herein regarding the weights and weighting factors is exemplary only.

In the customer attractiveness grouping 276, weighting factors 274 include cost to customer 284, speed of results 286, ease of use/viewability 288, provides convenience 290, promotes safety/health/ecology/social benefit 292, reliability 294, requires new equipment 296, more precision 298, quality/functionality/performance 300, satisfies existing need 302, quickly obsolete/instant anachronism 304, and too advanced technically/substantial learning curve 306 are the weighting factors 274 categories available for entry by the user, for weighting by system 10.

In the market factors grouping 278, weighting factors 274 include salability 308, market size/lack of market 310, trend of demand 312, difficulty of market penetration/entrenched competition 314, potential competition 316, excitement 318, market dependence/fluctuating market 320, cross marketing opportunity 322, attractive marketing 324, related product/service addability 326, difficulty to promote 328, and crowded field 330 are the weighting factors 274 categories available for entry by the user, for weighting by system 10.

In the production factors grouping 280, weighting factors 274 include margins/profitability 332, regulatory/compliance hassle 334, development effort 336, compatibility with existing services/products 338, ease/difficulty of production/delivery/distribution 340, long life cycle 342, ongoing service requirements 344, new production equipment required 346, and internal inertia to overcome 348 are the weighting factors 274 categories available for entry by the user, for weighting by system 10.

The user will assign a weight to each of the factors listed above, which will be entered into system 10 for generation of results described below. In the embodiment of FIG. 15 weights 272 actually used range from negative two (−2) to positive two (+2). Negative two implies a strong negative weight for weighting factor 274, negative one implies a slight negative weight for weighting factor 274, zero implies weighting factor 274 is inapplicable, positive one implies a slight positive weight for weighting factor 274, and finally positive two implies a strong positive weight for weighting factor 274. In one embodiment weights 272 for weighting factors 274 are entered using a pull down menu. As weights 272 are entered, a running total of the positives, negatives and a net total are generated. As shown in FIG. 15, a total positives result 350, a total negatives result 352, and a net positive/negative result 354 are displayed on user interface 270. In one embodiment, not shown in the Figure, user interface 270 is configured with a next page link. Selection of next page link by the user causes a competitive value user interface (described in FIG. 16 below) to be displayed.

FIG. 16 shows a competitive value user interface 370 which system 10 downloads and displays on client system 14 after the user has selected the competitive value tab 160 of selection bar 152. Components of user interface 370 which are identical to components of user interface 150, shown in FIG. 9, are identified in FIG. 16 using the same reference numerals as used in FIG. 9. Competitive value user interface 370 includes a series of questions to be answered by the user using a weighted scale, weighted from one to five where one represents "not very likely" and five represents "extremely likely". Questions included in the embodiment of FIG. 16 include a commercial likelihood question 374, a likelihood of competitor use within five years question 376, a value to competitor over the next three years question 378, a likelihood of knowledge of competitor use question 380, a current competitor use question 382, a what if the competitor could block your use question 384, and a what if you could block a competitor's use question 386. After a user enters scores, from one to five for all of the above listed questions, a total score 398 for the competitive value user interface is generated. In one embodiment, not shown in the Figure, user interface 370 is configured with a next page link. Selection of next page link by the user causes an overall assessment user interface (described in FIG. 17 below) to be displayed.

Figure 17:
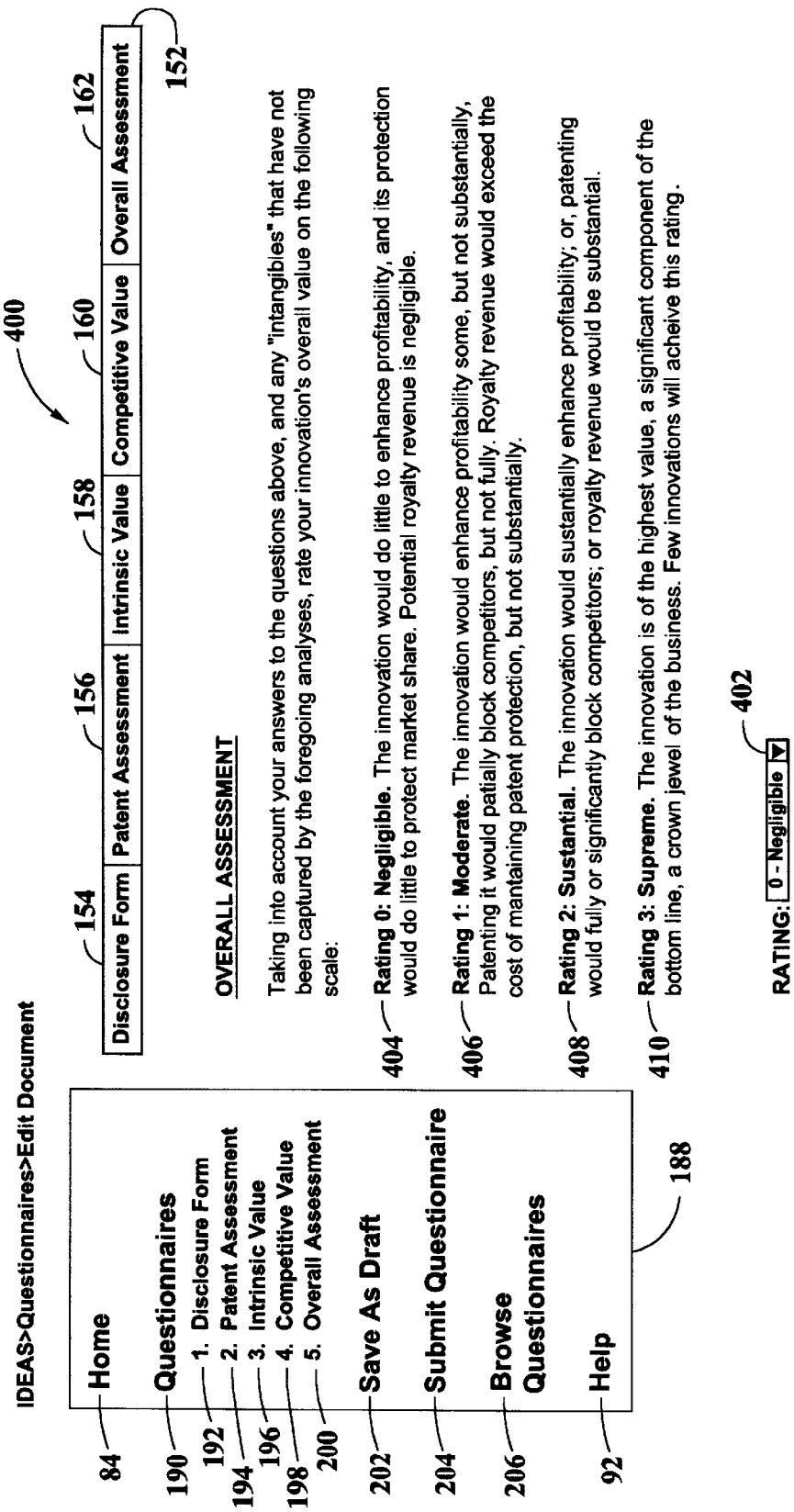
FIG. 17 is an overall assessment user interface.

FIG. 17 shows an overall assessment user interface 400 which is downloaded and displayed on client system 14 after the user has selected the overall assessment tab 162 of selection bar 152. Components of user interface 400 which are identical to components of user interface 150, shown in FIG. 9, are identified in FIG. 17 using the same reference numerals as used in FIG. 9. Overall assessment user interface 400 includes, in one embodiment, a rating input field 402 where a user can input his assessment of the overall value of the invention, taking into consideration values input into user interfaces as described above. As shown in FIG. 17, rating input field 402 can be one of four values, and may be configured as a pull-down menu. Rating input field 402 can be assigned a rating 404 of zero or negligible when the invention is found to do little to enhance profitability or protect market share. A rating 406 of one or moderate indicates some improvement to profitability and only a partial block to competitors. In addition, royalty revenue would be a small amount above the cost of maintaining patent protection. A rating 408 of two or substantial indicates a substantial improvement to profitability and that patenting would fully or significantly block competitors. Also royalty revenue would be substantial. A rating 410 of three or supreme is reserved for those innovations that dramatically change the way business is done.

FIG. 18 shows a portion of a manager's innovation handbook 430 downloaded and displayed on client system 14 by system 10 when a user selects help link 92 shown in multiple figures above and described in FIG. 6. Handbook 430 provides a guide to a user, such as a manager, on availability of patent protection, benefits of patent protection as a corporate strategy, and instructions on the role of an inventive team as to enforcement and acquisitions of patent protections.

Figure 19:
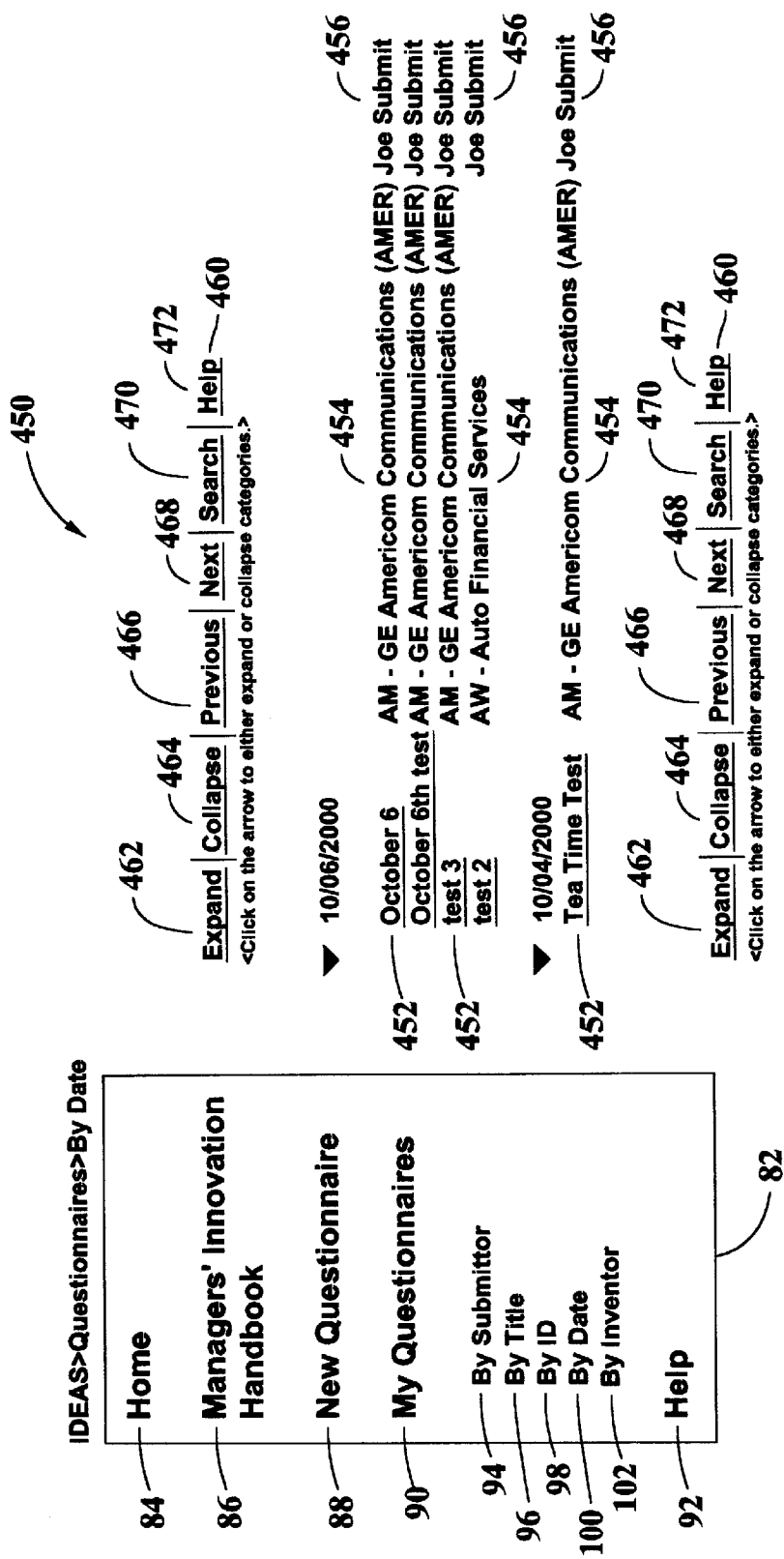
FIG. 19 is a browse existing invention disclosures by date user interface.

FIG. 19 shows a user interface 450 where a user has chosen to browse existing invention disclosures or questionnaires by date by selecting date 100 sublink of my questionnaires link 90. Components of user interface 450 which are identical to components of user interface 80, shown in FIG. 6, are identified in FIG. 19 using the same reference numerals as used in FIG. 6. After selection of date 100 sublink, disclosures submitted by the user are displayed by date. Other selections within my questionnaires 90 include, by submitter, by title, by ID and by inventor. In the embodiment shown, even though disclosures are listed by date, the disclosure information displayed under each date includes project name 452, business 454 and submittor 456 information. Also in the embodiment shown, project name 452 is configured as a link allowing user to display and edit the questionnaires described above. Also included are toolbars 460 which allow a user to peruse the displayed projects sorted by date by presenting multiple choices for viewing including expanding menus 462, collapsing menus 464, previous menu 466, next menu 468, search menu 470 and a help menu 472.

When a user is a registered user of the invention disclosure management system 10, as described above, system 10 restricts access of the user to certain elements of database 16 depending upon the user's position within a company. In one example and as described in more detail below, a senior intellectual property counsel for a multi-company corporation, might have access to all invention disclosures, and any data within the database 16 concerning the disclosures. Alternatively, an innovator within one of the companies of the above described corporation, may be restricted to the viewing of disclosures within their company, or even be further restricted to entry and later viewing of particular data entry fields of only their invention disclosures. In one embodiment (not shown), authorized users are able to access system 10 to determine status of submitted disclosures.

Figure 20:
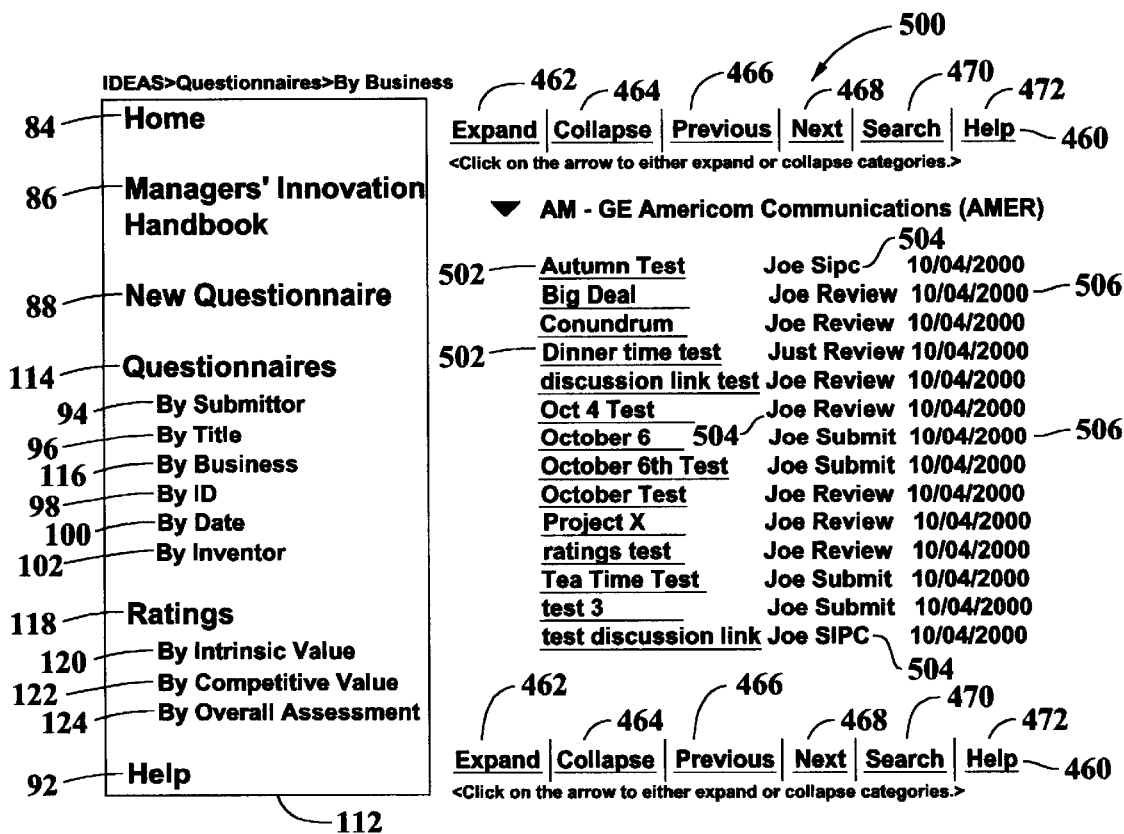
FIG. 20 is a user interface presented to a user who has privileges to review invention disclosures, the disclosures sorted by business unit.

FIG. 20 is a user interface 500 presented to a user who has privileges to review invention disclosures for a unit, for example, a business unit of a company who has selected to view invention disclosures sorted by business unit. Components of user interface 500 which are identical to components of user interface 110, shown in FIG. 7 and user interface 450, shown in FIG. 19, are identified in FIG. 20 using the same reference numerals as used in FIGS. 7 and 19. In the embodiment shown, even though disclosures are listed by business unit, the disclosure information displayed under each business unit includes project name 502, submittor 504 and date 506 information. Also in the embodiment shown, project name 502 is configured as a link allowing user to display and edit the questionnaires described above.

Figure 21:
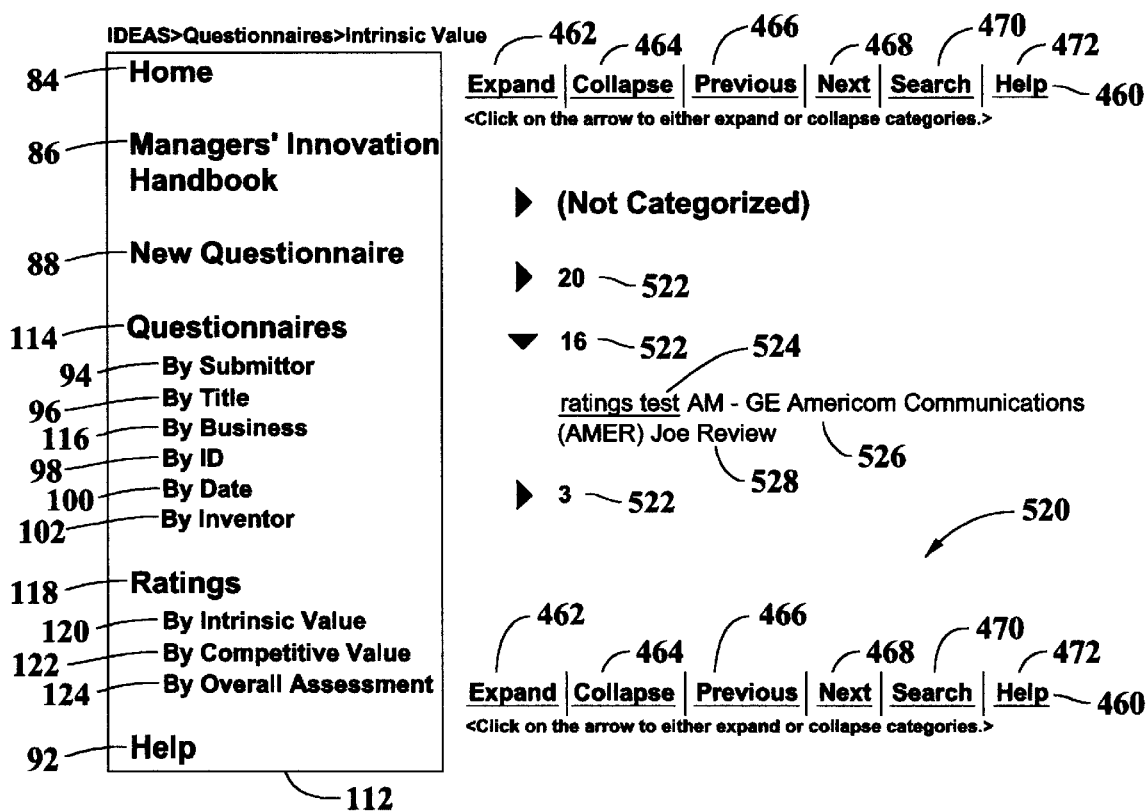
FIG. 21 is a user interface presented to a user who has privileges to review invention disclosures, the disclosures sorted by intrinsic value.

FIG. 21 is a user interface 520 presented to a user who has privileges to review invention disclosures who has selected to view invention disclosures sorted by intrinsic value. Components of user interface 520 which are identical to components of user interface 110, shown in FIG. 7 and user interface 450, shown in FIG. 19, are identified in FIG. 21 using the same reference numerals as used in FIGS. 7 and 19. In the embodiment shown, even though disclosures are listed by intrinsic value, the disclosure information displayed under each rating value 522 includes project name 524, business unit 526 and submittor 528 information. Also in the embodiment shown, project name 524 is configured as a link allowing user to display and edit the questionnaires described above. Link for viewing existing questionnaires by ratings 118 also includes a group of sublinks, described in FIG. 7, which format a display showing the existing questionnaires in a particular viewing order when selected. Included as sublinks are selections for viewing questionnaires by intrinsic value 120, by competitive value 122, and by overall assessment 124.

Figure 22:
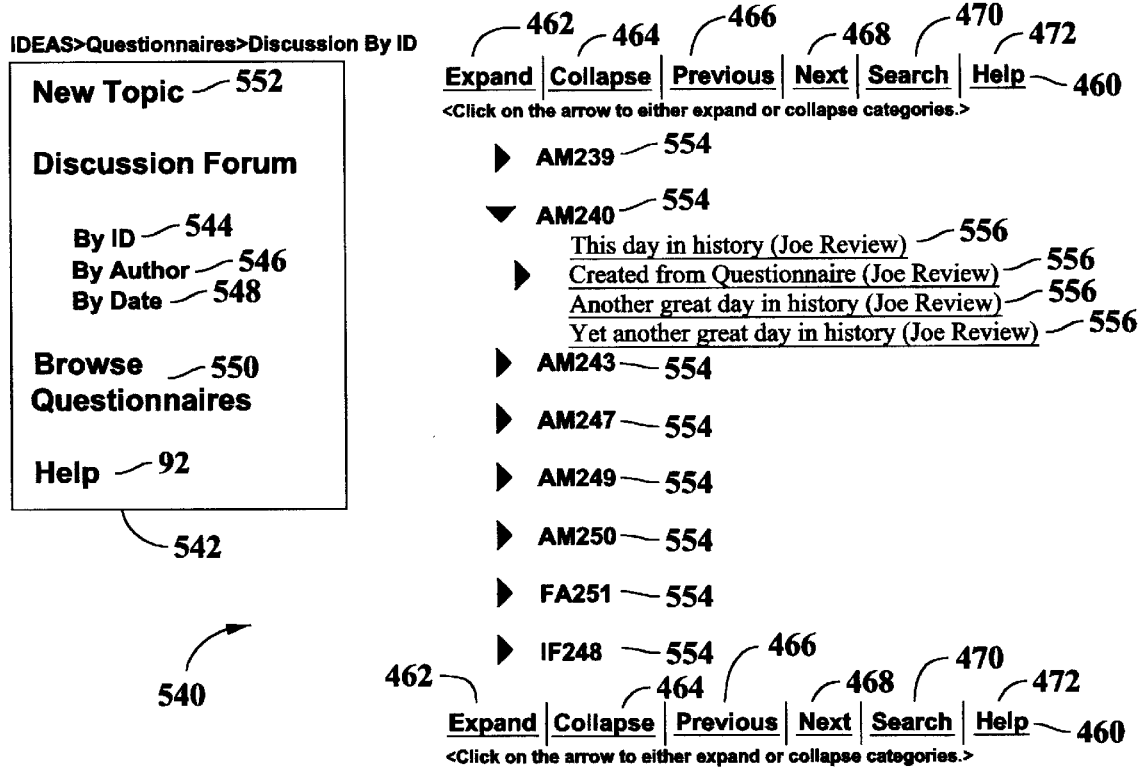
FIG. 22 is a user interface displayed when an authorized user has selected a link to a discussion forum, the disclosures sorted by ID number.

FIG. 22 is a user interface 540 displayed when an authorized user has selected go to discussion forum link 134 (shown in FIG. 8). Components of user interface 540 which are identical to components of user interface 450, shown in FIG. 19, are identified in FIG. 22 using the same reference numerals as used in FIG. 19. User interface 540 includes a link box 542 where the user can make selections for guidance to a particular discussion forum. Included in link box 542 are sublink selections where the user can choose to view existing discussion forums by ID 544, by author 546 or by date 548. Links are also included in link box 542 to browse existing questionnaires 550 and for help 92. As shown in user interface 540, discussion forums by ID 544 are displayed. To view a discussion topic, the user selects an ID 554 and chooses one of existing discussion topics 556. Replies to discussions (not shown in the Figure) are indented, and displayed as subjects, so that a user may track previous discussions in a logical progression. To add a new topic for a selected discussion, a user selects new topic link 552.

Figure 23:
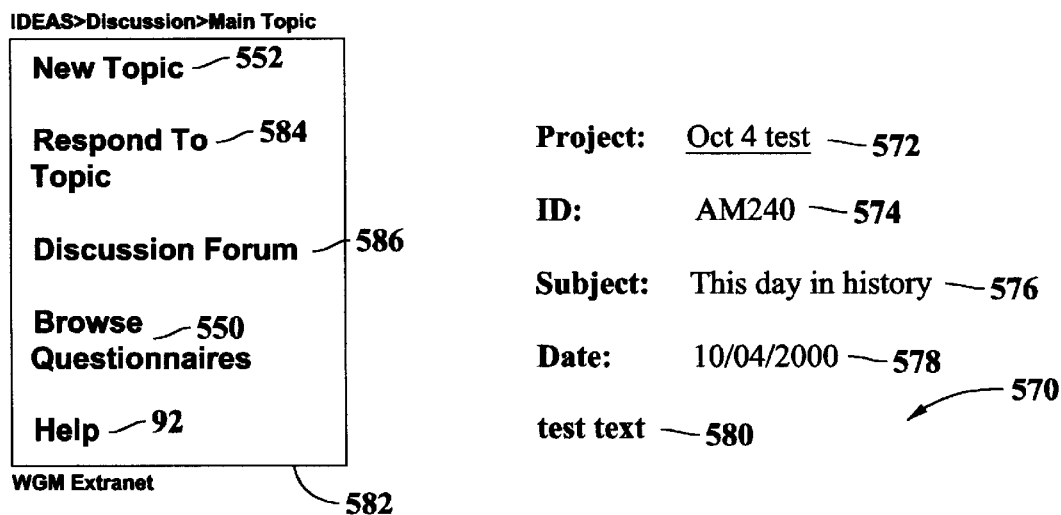
FIG. 23 is a user interface showing where a user has selected one of the discussion forum subjects shown in FIG. 22.

FIG. 23 is a user interface 570 showing where a user has selected one of the discussion forum subjects shown in FIG. 22 for viewing. Shown in user interface 570 are a project title 572, an ID 574, a subject 576 of the discussion, a date 578 of the discussion and the discussion text 580 itself. A link box 582 provides links to a user so that they may respond to the topic of the discussion by selecting a respond to topic link 584. Selecting discussion forum link 586 returns the user to user interface 540 (shown in FIG. 22) where the user can again choose to view discussions by ID, author, or date. Links are also included in link box 582 to browse existing questionnaires 550 and for help 92, both described above.

Figure 24:
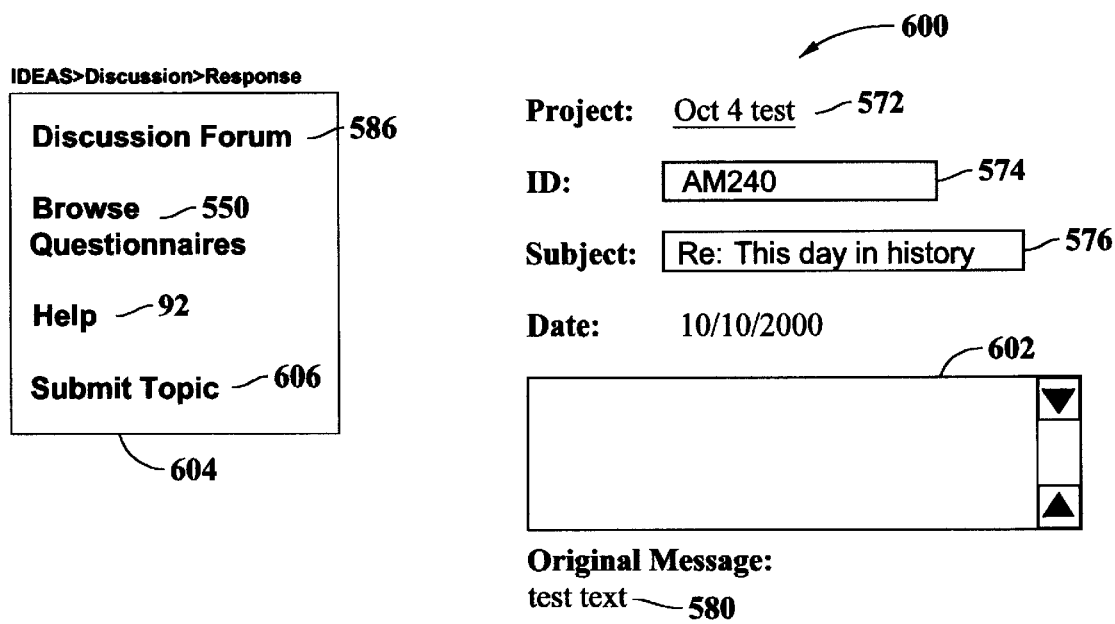
FIG. 24 is a user interface showing where a user has chosen to respond to the selected discussion forum subject shown in FIG. 23.

FIG. 24 is a user interface 600 displayed when a user has chosen respond to topic link 584. User interface allows a user to enter responses to the previous discussion and includes the same information as described in FIG. 23, but in addition includes a field 602 for entering the response to the discussion forum topic. Further, ID 574 and subject 576 are configured that a user may manually enter ID and subject information, thereby allowing discussion forum responses to various topics from one user interface. Link box includes a discussion forum link 586, a browse questionnaires link 55 and a help link 92 which are described above. In addition, link box 604 includes a submit topic link 606, which when selected by the user stores the text of the discussion entered by the user within data base 16. As stated above, in one embodiment, access to discussion forums regarding the invention disclosures is limited to legal personnel.

Figure 25:
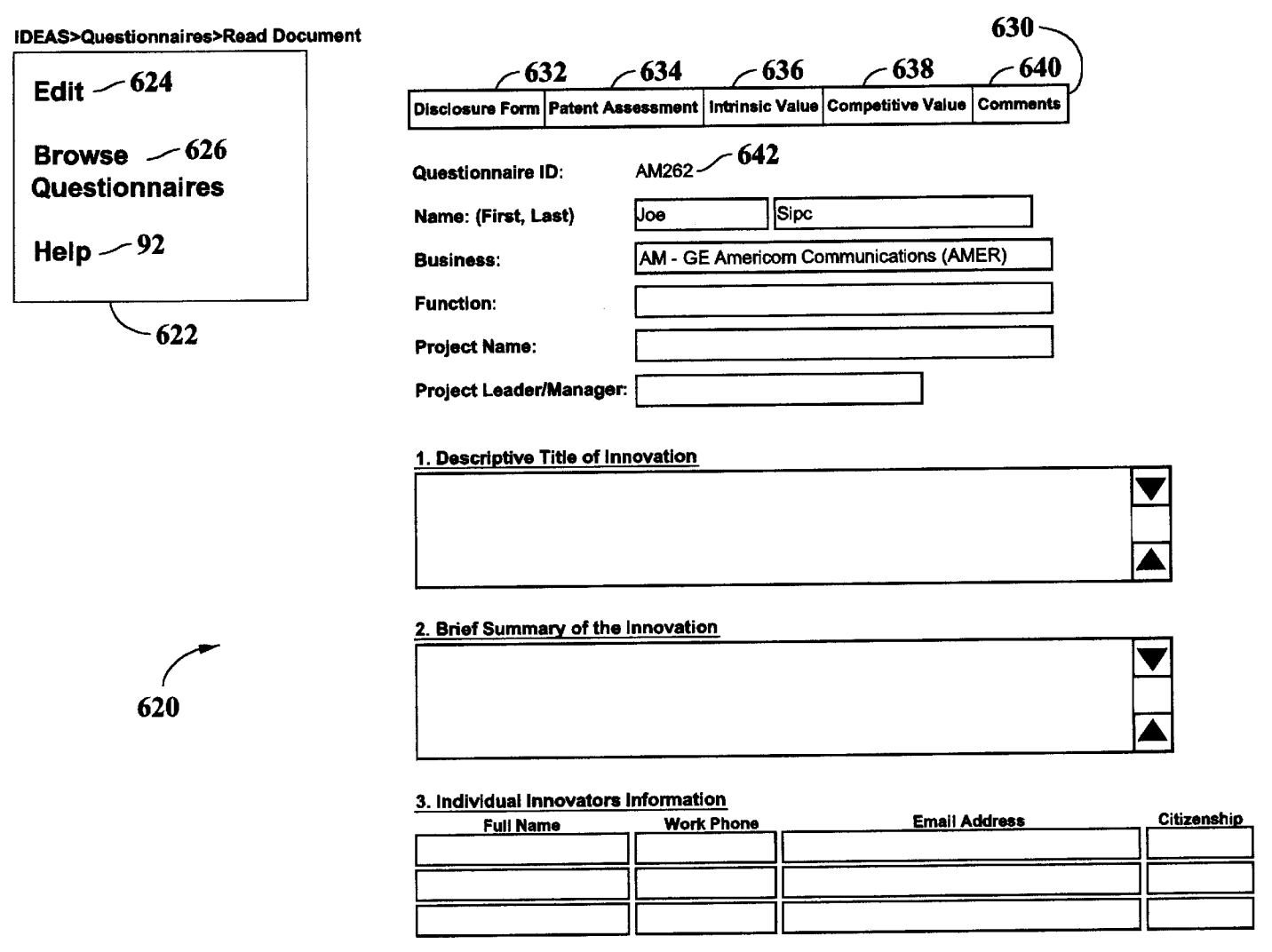

FIG. 25 is a user interface 620 which is presented to a high level reviewer of invention disclosures, for example, a senior intellectual property counsel or a business manager who has selected an existing invention disclosure for review. User interface 620 is similar to user interface 150 described in FIG. 9 therefore only differences between user interface 150 and user interface 620 are described. User interface 620 includes a link box 622 which includes, in one embodiment, selections include an edit link 624, a browse questionnaires link 626, and a help link 92. Edit link 624 allows the high level reviewer to make changes in the displayed questionnaire. Similar to selection bar 152 described in FIG. 9, a selection bar 630 in user interface 620 allows the reviewer to navigate and make changes throughout portions of the questionnaire. Included in selection bar 630 are a disclosure form tab 632, a patent assessment tab 634, an intrinsic value tab 636, a competitive value tab 638, and a comments tab 640.

Selection of disclosure form tab 632 in user interface 620 differs from selection of disclosure form tab 154 (shown in FIG. 9) in that the user interface displayed both the contents of the disclosure form as shown and described in FIGS. 9 and 10 and the overall assessment rating 402 as shown in FIG. 17 (not shown in FIG. 25). Questionnaire ID 642 is an example showing that a number has been assigned to a submitted invention disclosure as described in FIG. 9.

Figure 26:
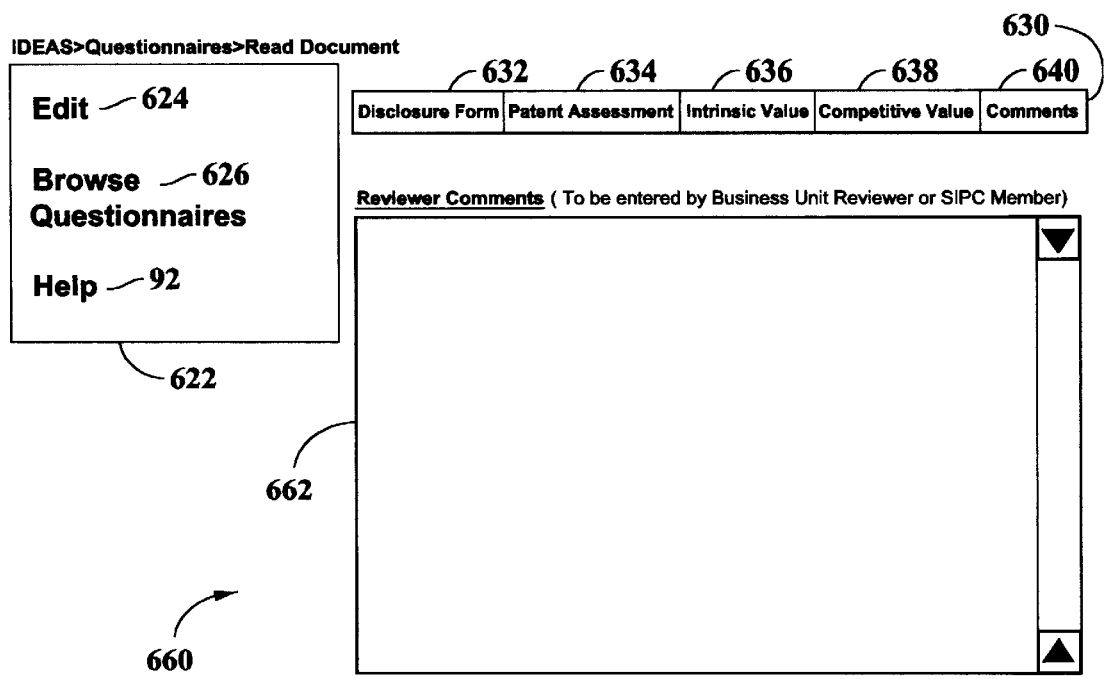
FIG. 26 is a user interface presented to the user after selection of comments tab described in FIG. 25.

As stated above, selection bar 630 includes comments tab 640. Selection of comments tab 640 presents to the user a user interface 660 as shown in FIG. 26. User interface 660 includes link box 622 and selection bar 630 as described in FIG. 25. In addition, user interface 660 includes a reviewer comments field 662 where the high level reviewer can enter comments regarding the invention disclosure as described by the submittor. Comments made by such a high level reviewer are not accessible by the submittor or the innovators due to access rights established in system 10 (shown in FIG. 1).

Figure 27:
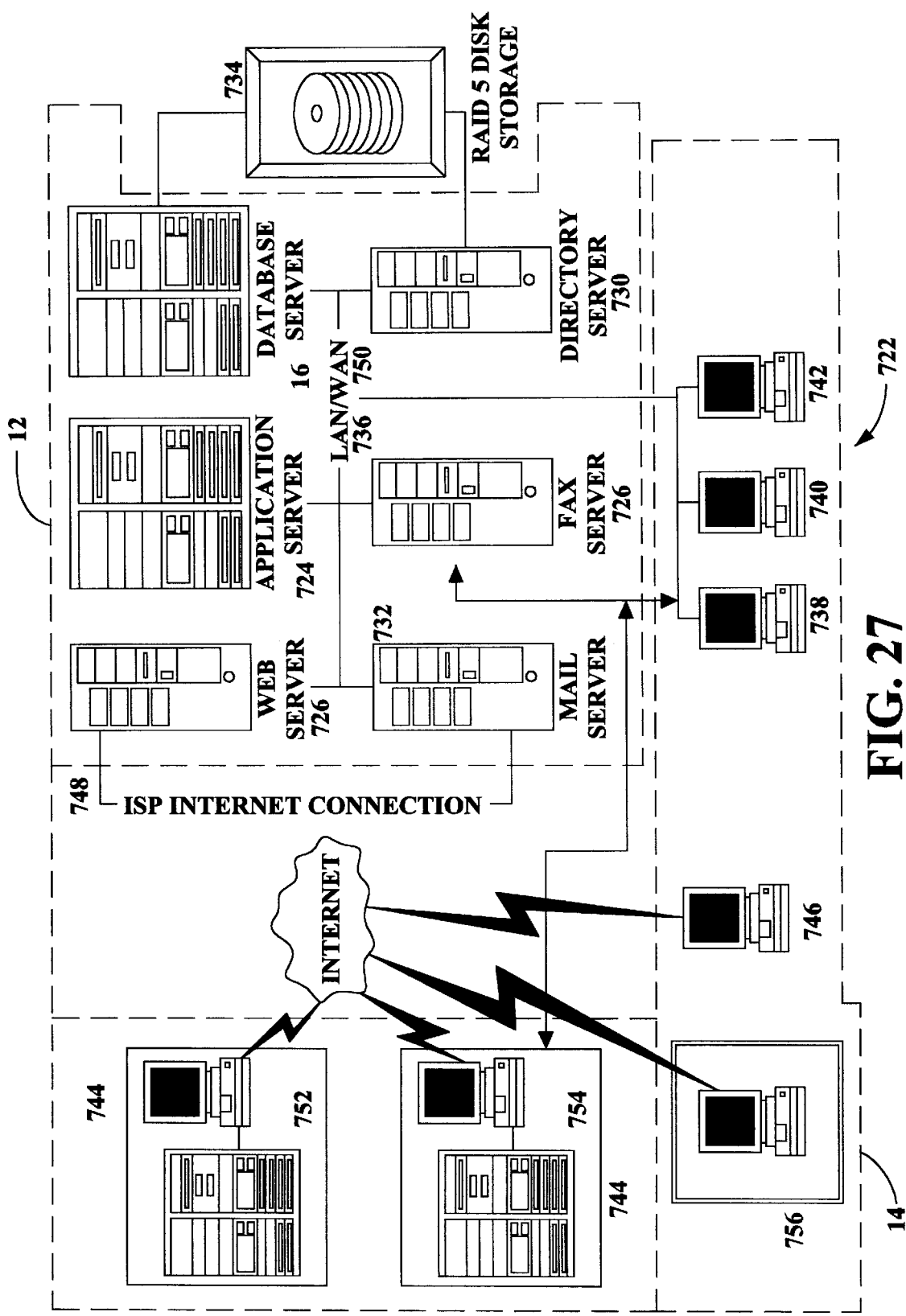
FIG. 27 is a detailed block diagram of a network based system.

FIG. 27 is a detailed block diagram of a network based system 722, equivalent to system 10 described in less detail in FIG. 1. System 722 includes server sub-system 12 and customer devices 14 (both shown in FIG. 1). Server sub-system 12 includes database server 16 (shown in FIG. 1), an application server 724, a web server 726, a fax server 728, a directory server 730, and a mail server 732. A disk storage unit 734 is coupled to database server 16 and directory server 730. Servers 16, 724, 726, 728, 730, and 732 are coupled in a local area network (LAN) 736. In addition, a system administrator work station 738, a work station 740, and a supervisor work station 742 are coupled to LAN 736. Alternatively, work stations 738, 740, and 742 are coupled to LAN 736 via an Internet link or are connected through an intranet.

Each work station 738, 740, and 742 is a personal computer including a web browser. Although the functions performed at the work stations typically are illustrated as being performed at respective work stations 738, 740, and 742, such functions can be performed at one of many personal computers coupled to LAN 736. Work stations 738, 740, and 742 are illustrated as being associated with separate functions only to facilitate an understanding of the different types of functions that can be performed by individuals having access to LAN 736.

Server sub-system 12 is configured to be communicatively coupled to various individuals or employees 744 and to third parties, e.g., innovators who are not employees, 746 via an ISP Internet connection 748. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 750, local area network 736 could be used in place of WAN 750.

In the exemplary embodiment, any employee 744 or outside innovator 746 having a work station 752 can access server sub-system 12. One of customer devices 14 includes a work station 754 located at a remote location. Work stations 752 and 754 are personal computers including a web browser. Also, work stations 752 and 754 are configured to communicate with server sub-system 12. Furthermore, fax server 728 communicates with employees 744 and outside innovators 746 located outside the business entity and any of the remotely located customer systems, including a customer system 756 via a telephone link. Fax server 728 is configured to communicate with other work stations 738, 740, and 742 as well.

System 722 allows for simple invention disclosure data entry by those who are most knowledgeable concerning the technical aspects of the invention, that is, the innovators. In addition, system 722 assigns each disclosure a number which can be used to access particular innovations within the database. System 722 also is configured to control access to databases within system 722 by job function, for example, management personnel are allowed to browse and sort the disclosures entered by innovators, and to make determinations on business value. In another example, system 722 is configured to allow legal personnel another access level, allowing them to enter comments, in the form of a discussion forum, pertaining to disclosures while preventing users without privileges from viewing those comments, thus protecting confidentiality. In the embodiment described herein, business reviewers and intellectual property attorneys are allowed to edit invention disclosures submitted by innovators. In an alternative embodiment, information entered by the innovators cannot be edited by any other users.

While the invention has been described in terms of various specific embodiments, those skilled in the art will recognize that the invention can be practiced with modification within the spirit and scope of the claims.

What is claimed is:

1. A method for management of invention disclosures using a system including a server and at least one device connected to the server via a network, said method comprising the steps of:

receiving invention disclosure information from a user via the device by uploading an invention disclosure form, the invention disclosure form includes at least one of a submittor name, a business unit, a project name, a project manager name, a descriptive title, a brief summary of the innovation, identification of other innovators, chronological data for the innovation, a background of the innovation, any known prior art related to the innovation, government contract data, awareness of other patents, and any results from a prior art search; and sorting invention disclosures based on criteria input by a user via the device.

2. A method according to claim 1 wherein data entry fields for at least one of submittor name, a business unit, a project name, a project manager name, a descriptive title, a brief summary of the innovation, identification of other innovators, chronological data for the innovation, a background of the innovation, and any known prior art related to the innovation are required to have data entered before an upload to the system is allowed.

3. A method according to claim 1 wherein title fields for at least one of a descriptive title, a brief summary, identification of other innovators, chronological information, a background of the innovation, known prior art, and a miscellaneous section are configured as links, selection of such links causing a description of the title field to be displayed.

4. A method according to claim 1 further comprising the step of notifying a named innovator by E-mail when named as an innovator within a submitted invention disclosure.

5. A method according to claim 4 further comprising the step inquiring by E-mail whether the named innovator wishes to become an authorized user of the system if not an authorized user already.

6. A method according to claim 1 further comprising the step of notifying at least one of the co-innovators, an attorney, a lab manager and a docket clerk by E-mail upon submission of an invention disclosure.

7. A method according to claim 1 further comprising the step of indicating which user has last modified any of the fields within the invention disclosure form.

8. A method according to claim 1 wherein said step of receiving invention disclosure information further comprises the step of uploading a patentability assessment.

9. A method according to claim 8 wherein said step of uploading a patentability assessment further comprises the step of selecting answers to patentability questions, selection of which causes further patentability questions or statements to be displayed.

10. A method according to claim 1 wherein said step of receiving invention disclosure information further comprises the step of uploading an intrinsic value assessment of the innovation.

11. A method according to claim 1 wherein said step of receiving invention disclosure information further comprises the step of uploading a competitive value assessment of the innovation.

12. A method according to claim 1 wherein said step of receiving invention disclosure information further comprises the step of uploading an overall assessment of the innovation.

13. A method according to claim 12 wherein said step of uploading an overall assessment of the innovation further comprises the step of uploading an assessment of an invention disclosure as one of negligible, moderate, substantial, and supreme.

14. A method according to claim 1 further comprising the step of displaying a manager's innovation handbook.

15. A method according to claim 1 further comprising the step of selecting a browse disclosures link.

16. A method according to claim 15 wherein said step of selecting a browse disclosures link further comprises the step of selecting to view by one of submittor, title, ID, date, business, and inventor.

17. A method according to claim 1 further comprising the step of selecting a browse by ratings link.

18. A method according to claim 17 wherein said step of selecting a browse by ratings link further comprises the step of selecting to view by one of intrinsic value, competitive value, and overall assessment.

19. A method according to claim 1 further comprising the step of restricting access to the invention disclosure system to registered users.

20. A method according to claim 19 further comprising the step of sending a temporary password to an authorized user by E-mail if the authorized user has indicated that they have forgotten their password.

21. A method according to claim 19 wherein said step of limiting access the invention disclosure database to registered users further comprises the step of configuring the system where a user can register to become an authorized user.

22. A method according to claim 21 further comprising the step of assigning passwords to newly authorized users automatically through the system.

23. A method according to claim 19 wherein said step of limiting access the invention disclosure database to registered users further comprises the step of establishing new user accounts through a system manager.

24. A method according to claim 23 further comprising the step of having the system manager assign passwords to newly authorized users.

25. A method according to claim 1 further comprising the step of limiting functions accessible to users of the invention disclosure database based upon job function.

26. A method according to claim 25 wherein said step of limiting functions accessible to users based upon job function further comprises the step of limiting access to discussion forums to legal personnel to preserve an attorney-client privilege with respect to such discussions.

27. A method according to claim 25 wherein said step of limiting functions accessible to users based upon job function further comprises the step of limiting access to comment fields within an invention disclosure form to reviewers of invention disclosures.

28. A method according to claim 1 wherein said step of receiving invention disclosure information further comprises the step of automatically assigning a questionnaire ID to a submitted invention disclosure.

29. A method according to claim 1 wherein said step of receiving invention disclosure information further comprises the step of saving an invention disclosure as a draft, with no questionnaire ID assigned.

30. A method according to claim 1 wherein said step of sorting invention disclosures further comprises the step of selecting a link to a discussion forum.

31. A method according to claim 30 wherein said step of selecting a link to a discussion forum further comprises the step of sorting discussion forums for viewing or comment by one of ID, author and date.

32. A method according to claim 31 further comprising the step of selecting a discussion forum topic.

33. A method according to claim 32 wherein said step of selecting a discussion forum topic further comprises the step of selecting one of a new topic or a response to a topic.

34. A method according to claim 33 wherein said step of selecting one of a new topic or a response to a topic further comprises the step of submitting a topic to the discussion forum.

35. A method according to claim 1 wherein said step of receiving invention disclosure information further comprises the step of attaching files to the invention disclosure.

36. A method according to claim 1 wherein said step of receiving invention disclosure information further comprises the step of indicating which components of a corporation would be interested in such an invention.

37. A method according to claim 36 further comprising the step of indicating at least one of keywords and product lines which may be affected by the invention.

38. A method according to claim 1 further comprising the step of allowing a user to access a status regarding a previously stored invention disclosure.

39. An invention disclosure management system comprising:

at least one computer;

a server configured with an invention disclosure database and an invention disclosure management user interface, said server further configured to utilize an invention disclosure form to upload and store user input regarding invention disclosures in said database, said invention disclosure form configured with data entry fields for accepting user input, said data entry fields including at least one of a submittor name, a business unit, a project name, a project manager name, a descriptive title, a brief summary of the innovation, identification of other innovators, chronological data for the innovation, a background of the innovation, any known prior art related to the innovation, government contract data, awareness of other patents, and results from a prior art search; and a network connecting said server to said computer.

40. A system according to claim 39 wherein said server is configured to require data entry into at least one of submittor name, a business unit, a project name, a project manager name, a descriptive title, a brief summary of the innovation, identification of other innovators, chronological data for the innovation, a background of the innovation, any known prior art related to the innovation, government contract data, awareness of other patents, and results from a prior art search data entry fields before any data is uploaded to said server.

41. A system according to claim 39 wherein said server is configured with title fields for at least one of a descriptive title, a brief summary, identification of other innovators, chronological information, a background of the innovation, known prior art, and a miscellaneous section, said title fields configured as links, selection of one of said title fields causing a description of the selected title field to be displayed.

42. A system according to claim 41 wherein said server is configured to notify by E-mail identified innovators in an uploaded invention disclosure form.

43. A system according to claim 42 wherein said server is configured to inquire by E-mail whether the named innovator wishes to become an authorized user of the system if not an authorized user already.

44. A system according to claim 41 wherein said server is configured to notify at least one of the co-innovators, an attorney, a lab manager and a docket clerk by E-mail upon submission of an invention disclosure.

45. A system according to claim 41 further comprising the step of indicating which user has last modified any of the fields within the invention disclosure form.

46. A system according to claim 39 wherein said server further configured with a patentability assessment form further configured with data entry fields to accept user answers to patentability questions for upload and storage in said database.

47. A system according to claim 46 wherein said server is configured to present further patentability questions and statements, based upon answers chosen on said patentability assessment form.

48. A system according to claim 39 wherein said server further configured with an assessment of intrinsic value form further configured with data entry fields to accept user input for upload and storage in said database.

49. A system according to claim 39 wherein said server further configured with an assessment of competitive value form further configured with data entry fields to accept user input for upload and storage in said database.

50. A system according to claim 39 wherein said server further configured with an overall assessment form further configured with data entry fields to accept user input for upload and storage in said database.

51. A system according to claim 50 wherein said overall assessment form further configured to upload an overall assessment of an invention disclosure as one of negligible, moderate, substantial, or supreme to the invention disclosure database.

52. A system according to claim 39 wherein said server further configured with a manager's innovation handbook.

53. A system according to claim 39 wherein said server further configured with links to browse the invention disclosure database.

54. A system according to claim 53 wherein said links comprise at least one of submittor, title, ID, date, business, inventor, intrinsic value, competitive value and overall assessment.

55. A system according to claim 39 wherein said server further configured to restrict access to said invention disclosure database.

56. A system according to claim 55 wherein said server further configured to send a temporary password to an authorized user by E-mail if the authorized user had indicated they have forgotten their password.

57. A system according to claim 55 wherein said server is configured to allow new users to register as authorized users.

58. A system according to claim 57 wherein said server is configured to assign passwords newly authorized users.

59. A system according to claim 55 wherein said server is configured with a system manager account wherein only a system manager can establish new user accounts.

60. A system according to claim 59 wherein said server is configured to allow the system manager to assign passwords to newly authorized users.

61. A system according to claim 39 wherein said server is configured to limit functions accessible to users of the invention disclosure database based upon job function.

62. A system according to claim 61 wherein said server is configured with discussion forums, access to said discussion forums limited to legal personnel.

63. A system according to claim 61 wherein said server is configured with comment fields, access to said comment fields limited to reviewers of invention disclosures.

64. A system according to claim 39 wherein said server is further configured to automatically assign a questionnaire ID to an uploaded invention disclosure.

65. A system according to claim 39 wherein said server is further configured to save an invention disclosure as a draft, with no questionnaire ID being assigned.

66. A system according to claim 65 wherein said server is configured to sort discussion forums by at least one of ID, author and date.

67. A system according to claim 66 wherein said discussion forums are configured with topics configured as links.

68. A system according to claim 67 wherein said server is configured with selections for one of a response to a selected discussion forum topic and a new topic for discussion within said discussion forum.

69. A system according to claim 68 wherein said server is configured to upload and store one of a response to a selected discussion forum topic and a new topic for discussion within said discussion forum.

70. A system according to claim 39 wherein said network is at least one of the Internet, an intranet, a local area network (LAN), a wide area network (WAN), dial-in-connections, cable modems and special high-speed ISDN lines.

71. A system according to claim 39 wherein said server is configured to attach files to the invention disclosure.

72. A system according to claim 39 wherein said server is configured to store information which indicates components of a corporation that would be interested in such an invention.

73. A system according to claim 72 wherein said server is configured to indicate at least one of keywords and product lines which may be affected by the invention.

74. A system according to claim 39 wherein said server is configured to allow a user to access a status regarding a previously stored invention disclosure.

75. A method for management of invention disclosures using an invention disclosure management system, said method comprising the steps of:
    completing and submitting an invention disclosure form; and
    completing and submitting assessment forms, including at least one of a patentability assessment form, an intrinsic value assessment form, a competitive value assessment form and an overall assessment form.

76. A method according to claim 75 wherein said step of completing and submitting an invention disclosure form further comprises the step of submitting at least one of a submittor name, a business unit, a project name, a project manager name, a descriptive title, a brief summary of the innovation, identification of other innovators, chronological data for the innovation, a background of the innovation, any known prior art related to the innovation, government contract data, awareness of other patents, and any results from a prior art search.

77. A method according to claim 75 wherein said step of completing and submitting an overall assessment form further comprises the step of selecting an assessment of the invention disclosure as one of negligible, moderate, substantial, and supreme.

78. Apparatus comprising:
    means for receiving invention disclosure information from a user by displaying an invention disclosure form, said invention disclosure information comprising at least one of a submittor name, a business unit, a project name, a project manager name, a descriptive title, a brief summary of the innovation, identification of other innovators, chronological data for the innovation, a background of the innovation, any known prior art related to the innovation, government contract data, awareness of other patents, and any results from a prior art search;
    means for sorting invention disclosures based on user input; and
    means for receiving inputs regarding the invention disclosures from other users.

79. Apparatus according to claim 78 further comprising means for displaying descriptions describing at least one of the descriptive title, the brief summary of the innovation, the identification of other innovators, the chronological data for the innovation, and the background of the innovation.

80. Apparatus according to claim 78 wherein said means for means for receiving invention disclosure information comprises means for displaying at least one of a patentability assessment, an intrinsic value assessment, a competitive value assessment and an overall assessment of an innovation.

81. Apparatus according to claim 78 wherein said means for sorting invention disclosures comprises means to browse disclosures by at least one of submitter, title, ID, date, business name and inventor.

82. Apparatus according to claim 78 wherein said means for sorting invention disclosures comprises means to browse disclosures by ratings including at least one of intrinsic value, competitive value and overall assessment.

83. Apparatus according to claim 78 further comprising means to restrict access to said apparatus to authorized users of the apparatus.

84. Apparatus according to claim 78 wherein said means for receiving inputs regarding the invention disclosures from other users further comprises means for holding discussion forums regarding the invention disclosures.

85. Apparatus according to claim 78 wherein said means for receiving inputs regarding the invention disclosures from other users further comprises means for supplying comment fields where the other users may comment on the invention disclosures.

86. Apparatus according to claim 78 further comprising means to notify innovators that have been named in an invention disclosure.

87. A computer-readable medium comprising:
    a record of submitted invention disclosures, said record of invention disclosures comprising at least one of a submittor name, a business unit, a project name, a project manager name, a descriptive title, a brief summary of the innovation, identification of other innovators, chronological data for the innovation, a background of the innovation, any known prior art related to the innovation, government contract data, awareness of other patents, and any results from a prior art search;
    a plurality of rules for formatting invention disclosures and allowing access to the invention disclosures; and
    a record of reviews and discussions regarding the submitted invention disclosures.

88. A computer-readable medium according to claim 87 wherein said record of invention disclosures comprises at least one of a patentability assessment, an intrinsic value assessment, a competitive value assessment and an overall assessment of the innovation.

89. A computer-readable medium according to claim 87 further comprising a manager's innovation handbook.

90. A computer-readable medium according to claim 87 wherein said plurality of rules for formatting invention disclosures further comprises rules for formatting invention disclosure by at least one of submittor, title, ID, date, business, inventor, intrinsic value, competitive value, overall assessment and author.

91. A method for management of invention disclosure and assessment forms using an invention disclosure management system, said method comprising the steps of:
    sorting submitted forms based on one or more selected criteria;
    reviewing completed invention disclosure form and assessment forms including browsing the invention disclosures by sorting according to at least one of intrinsic value, competitive value, and overall assessment; and
    providing an input concerning the invention disclosure.

92. A method according to claim 91 wherein said step of sorting submitted forms comprises the step of limiting access to the submitted forms to authorized personnel based upon job function.

93. A computer-readable medium for programming a computer to perform the steps of:
    record submitted invention disclosures wherein said invention disclosure record comprises at least one of a submittor name, a business unit, a project name, a project manager name, a descriptive title, a brief summary of the innovation, identification of other innovators, chronological data for the innovation, a background of the innovation, any known prior art related to the innovation, government contract data, awareness of other patents, and any results from a prior art search;
    execute rules for formatting invention disclosures and allowing access to the invention disclosures; and record reviews and discussions regarding the submitted invention disclosures.

94. A computer-readable medium according to claim 93 wherein said invention disclosure record comprises at least one of a patentability assessment, an intrinsic value assessment, a competitive value assessment and an overall assessment of the innovation.

95. A computer-readable medium according to claim 93 wherein said rules for formatting invention disclosures comprises rules for formatting invention disclosure by at least one of submittor, title, ID, date, business, inventor, intrinsic value, competitive value, overall assessment and author.

* * * * *

UNITED STATES PATENT AND TRADEMARK OFFICE
CERTIFICATE OF CORRECTION

PATENT NO. : 6,654,767 B2
DATED : November 25, 2003
INVENTOR(S) : McAnaney et al.

It is certified that error appears in the above-identified patent and that said Letters Patent is hereby corrected as shown below:

Title page,
Item [75], Inventors, delete "Mary McCrea NcNamara" and insert therefor
-- Mary McCrea McNamara --.
Item [57], ABSTRACT,
Line 8, delete "submitter" and insert therefor -- submittor --.

Drawings,
Figure 2, reference no. 44, delete "Forms" and insert therefor -- Forums --.
Figure 24, insert reference no. -- 578 -- to reference "Date: 10/10/2000" shown in the figure.
Figure 27, delete reference no. "726" and insert therefor -- 728 -- for "FAX Server" shown in the figure.

Column 2,
Line 22, delete "as way as" and insert therefor -- a way as --.
Line 54, delete "patentabilty" and insert therefor -- patentability --.

Column 4,
Line 59, delete "a account" and insert therefor -- an account --.

Column 5,
Line 5, delete "system 10, that" insert therefor -- system 10 that --
Line 55, delete "102" and insert therefor -- 112 --.

Column 8,
Line 11, between "and" and "offer" insert -- an --.
Line 29, delete "in FIG. 11"and insert therefor -- in FIG. 10 --.
Line 61, delete "shown questions" and insert therefore --shown, questions --.
Lines 62-63, delete "of the invention where" and insert therefor
-- of the invention, is where --.

Column 12,
Line 59, delete "55" and insert therefor -- 550 --.

Column 13,
Line 7, delete "selections include" and insert therefor -- selections that include --.

Column 15,
Line 67, between "access" and "the" insert -- to --.

UNITED STATES PATENT AND TRADEMARK OFFICE
CERTIFICATE OF CORRECTION

PATENT NO. : 6,654,767 B2
DATED : November 25, 2003
INVENTOR(S) : McAnaney et al.

It is certified that error appears in the above-identified patent and that said Letters Patent is hereby corrected as shown below:

<u>Column 16,</u>
Line 8, between "access" and "the" insert -- to --.

<u>Column 17,</u>
Line 33, delete "to claim 41" and insert therefor -- to claim 39 --.
Line 40, delete "to claim 41" and insert therefor -- to claim 39 --.
Line 44, delete "to claim 41" and insert therefor -- to claim 39 --.

<u>Column 18,</u>
Line 24, between "passwords" and "newly" insert -- to --.

<u>Column 19,</u>
Lines 51-52, delete "wherein said means for means" and insert therefor -- wherein said means --.
Line 59, delete "submitter" insert therefor -- submittor --.

Signed and Sealed this

Twentieth Day of April, 2004

JON W. DUDAS
*Acting Director of the United States Patent and Trademark Office*